(12) United States Patent
Yokomizo et al.

(10) Patent No.: US 10,843,387 B2
(45) Date of Patent: Nov. 24, 2020

(54) METHOD OF MANUFACTURING A PRESS MOLDING

(71) Applicants: TEIJIN LIMITED, Osaka (JP); TOSHIBA MACHINE CO., LTD., Tokyo (JP)

(72) Inventors: Hodaka Yokomizo, Osaka (JP); Tetsuya Yoneda, Osaka (JP); Akihiko Obata, Osaka (JP); Kazuhito Sato, Numazu (JP); Chiaki Shigematsu, Numazu (JP)

(73) Assignees: TEIJIN LIMITED, Osaka (JP); SHIBAURA MACHINE CO., LTD., Tokyo (JP)

( * ) Notice: Subject to any disclaimer, the term of this patent is extended or adjusted under 35 U.S.C. 154(b) by 239 days.

(21) Appl. No.: 16/062,187

(22) PCT Filed: Dec. 16, 2016

(86) PCT No.: PCT/JP2016/088600
§ 371 (c)(1),
(2) Date: Jun. 14, 2018

(87) PCT Pub. No.: WO2017/104857
PCT Pub. Date: Jun. 22, 2017

(65) Prior Publication Data
US 2018/0361632 A1  Dec. 20, 2018

(30) Foreign Application Priority Data

Dec. 18, 2015  (JP) .................................. 2015-247471

(51) Int. Cl.
*B29C 43/34*  (2006.01)
*B29C 43/02*  (2006.01)
(Continued)

(52) U.S. Cl.
CPC .......... *B29C 43/34* (2013.01); *B25J 15/0071* (2013.01); *B29C 31/04* (2013.01); *B29C 31/08* (2013.01);
(Continued)

(58) Field of Classification Search
None
See application file for complete search history.

(56) References Cited

U.S. PATENT DOCUMENTS

| 6,022,208 A | 2/2000 | Padovani |
| 2009/0146440 A1* | 6/2009 | Buljo ..................... A01K 17/00 294/61 |

(Continued)

FOREIGN PATENT DOCUMENTS

| DE | 3843342 A1 | 6/1990 |
| EP | 2 626 181 A2 | 8/2013 |

(Continued)

OTHER PUBLICATIONS

JPlatPat machine translation of JP2014051035A (retrieved Mar. 30, 2020).*

(Continued)

*Primary Examiner* — Peter L Vajda
*Assistant Examiner* — Paul Spiel
(74) *Attorney, Agent, or Firm* — Sughrue Mion, PLLC

(57) ABSTRACT

To provide a method of manufacturing a press molding by molding a molding material comprising reinforced fibers and a thermoplastic resin by a cold press method. The method of manufacturing a press molding comprising reinforced fibers and a thermoplastic resin, includes the steps of:
holding the molding material heated at a temperature not lower than the softening temperature with a plurality of grippers installed on a carrier;
carrying the molding material between the upper mold and the lower mold of a mold for molding;
pushing the molding material with pushers to preform it at a predetermined preforming rate; and
press molding the preformed molding by closing the upper mold and the lower mold and applying pressure.

11 Claims, 6 Drawing Sheets

(51) Int. Cl.
  B29C 70/54    (2006.01)
  B29C 31/04    (2006.01)
  B25J 15/00    (2006.01)
  B29C 70/46    (2006.01)
  B29C 31/08    (2006.01)
  B29C 70/12    (2006.01)
  B29C 43/00    (2006.01)
  B29K 101/12   (2006.01)
  B29K 307/04   (2006.01)

(52) U.S. Cl.
  CPC ............ *B29C 43/003* (2013.01); *B29C 43/02* (2013.01); *B29C 70/12* (2013.01); *B29C 70/46* (2013.01); *B29C 70/54* (2013.01); *B29C 70/542* (2013.01); *B29C 2043/3411* (2013.01); *B29K 2101/12* (2013.01); *B29K 2307/04* (2013.01)

(56) References Cited

U.S. PATENT DOCUMENTS

| | | |
|---|---|---|
| 2013/0317161 A1 | 11/2013 | Konagai et al. |
| 2014/0148072 A1 | 5/2014 | Nagakura et al. |
| 2014/0246810 A1 | 9/2014 | Kato et al. |
| 2016/0194468 A1 | 7/2016 | Ogasawara et al. |
| 2018/0169901 A1 | 6/2018 | Sato et al. |
| 2018/0304556 A1* | 10/2018 | Reinhold ................ B29C 31/08 |

FOREIGN PATENT DOCUMENTS

| | | |
|---|---|---|
| EP | 2 671 991 A1 | 12/2013 |
| EP | 3 045 489 A1 | 7/2016 |
| JP | 58-191980 U | 12/1983 |
| JP | 61-72542 U | 5/1986 |
| JP | 2008-254438 A | 10/2008 |
| JP | 4631395 B2 | 2/2011 |
| JP | 2011-168009 A | 9/2011 |
| JP | 2014-51035 A | 3/2014 |
| JP | 2014-51077 A | 3/2014 |
| JP | 2014-168864 A | 9/2014 |
| WO | 2012/105080 A1 | 8/2012 |
| WO | 2015/037570 A1 | 3/2015 |

OTHER PUBLICATIONS

International Preliminary Report on Patentability with translation of Written Opinion dated Jun. 28, 2018, issued by the International Searching Authority in application No. PCT/JP2016/088600.
Communication dated Nov. 21, 2018, from the European Patent Office in counterpart European Application No. 16875831.6.
Communication dated Mar. 5, 2020, from the United States Patent and Trademark Office in U.S. Appl. No. 15/830,884.
International Search Report for PCT/JP2016/088600 dated Apr. 4, 2017 [PCT/ISA/210].

* cited by examiner

US 10,843,387 B2

METHOD OF MANUFACTURING A PRESS MOLDING

CROSS REFERENCE TO RELATED APPLICATIONS

This application is a National Stage of International Application No. PCT/JP2016/088600, filed on Dec. 16, 2016, which claims priority from Japanese Patent Application No. 2015-247471, filed on Dec. 18, 2015.

TECHNICAL FIELD

The present invention relates to a method of manufacturing a preformed molding and a press molding of a fiber-reinforced resin composite material comprising carbon fibers and a thermoplastic resin. More specifically, it relates to a technique of compression molding a thermally molten fiber-reinforced resin composite material in a mold which has been adjusted to a temperature not higher than the melting point or glass transition temperature of the resin, which is advantageously used for the manufacture of a structural part for vehicles.

BACKGROUND ART

Since fiber-reinforced resin moldings have various excellent characteristic properties such as specific strength, specific rigidity, fatigue resistance and vibration damping property, they are used in a wide variety of fields such as daily necessaries, sport uses, and automobile and aerospace uses. To meet the requirements for each product, most of them are molded into desired product shapes by various molding techniques and then subjected to secondary processing to become finished products in most cases. Therefore, the research and development of various technologies for molding and processing the fiber-reinforced resin moldings are actively under way.

To improve the mass-productivity of the fiber-reinforced resin moldings, especially mass-productivity at the time of molding, isotropic molding materials comprising a thermoplastic resin as a matrix resin are widely studied now. The isotropic molding materials comprising a thermoplastic resin as a matrix resin are compression molded by using a press apparatus after heating to become fiber-reinforced resin moldings. A molding can be obtained by carrying an isotropic molding material onto a mold which has been adjusted to a temperature not higher than the melting point or glass transition temperature of the thermoplastic resin in a press apparatus while it is heated and clamping the mold in the subsequent step. A cold press method which is this molding method is promising as it has a short molding time and high production efficiency. Further, it is possible to mold even a molding having a complex shape stably by carrying out preforming before molding. It is demonstrated that the formation of a crease can be prevented by preforming (refer, for example, to Patent Document 1).

However, preforming by the cold press method reduces the temperature of the fiber-reinforced composite material, thereby greatly deteriorating moldability. Therefore, a technology for carrying out preforming in a short time to prevent the reduction of the temperature of the fiber-reinforced composite material is desired. There is disclosed a technique for holding a composite material in air to prevent the composite material from being cooled upon contact with a mold for cold pressing. However, preforming into a complex shape is difficult with this mechanism (refer, for example, to Patent Document 2).

Meanwhile, to take out a thermally molten composite material from a heating furnace and carry it onto a mold, known methods such as one in which the composite material is grasped with a clip-like object, one in which the composite material is scooped up with a rod-like object and one in which the composite material is stuck with a needle-like object are used. Although the molten composite material can be carried in these methods, it is difficult to preform the material by using a carrier. To form the molten composite material in a mold for cold pressing, there is disclosed a technique for molding the composite material in a mold having a multi-stage operating nest while it is preformed (refer, for example, to Patent Document 3). However, preforming into a complex shape which is the object of the present invention is difficult with this technique.

(Patent Document 1) JP-A 2014-051077
(Patent Document 2) JP-A 2014-168864
(Patent Document 3) Japanese Patent No. 4631395

DISCLOSURE OF THE INVENTION

Problem to be Solved by the Invention

It is an object of the present invention to provide a method of manufacturing a press molding through the step of preforming a thermoplastic isotropic molding material for a fiber-reinforced resin molding. It is another object of the present invention to provide a method of manufacturing a press molding by molding a preformed molding by a cold press method.

Means for Solving the Problem

The inventors of the present invention found that it is possible to carry out the preforming of an isotropic molding material comprising carbon fibers and a thermoplastic resin on a mold for cold pressing at a preforming rate of 80 to 100% by using a pushing jig installed on a carrier jig after the molten molding material is hooked with a hook-like needle installed on the carrier jig to be carried onto the mold when the isotropic molding material is to be molded by a cold press method. The present invention was thus accomplished. That is, the present invention is a manufacturing method for obtaining a press molding, comprising the steps of:

carrying a fiber-reinforced resin composite material comprising reinforced fibers and a thermoplastic resin onto a mold for cold pressing;

preforming the material in that state to produce a preformed molding; and press molding the preformed molding.

[1] A method of manufacturing a press molding, comprising the following steps:

Step 11: step of heating a molding material comprising discontinuous carbon fibers having a weight average fiber length of not less than 2 mm and a thermoplastic resin at a temperature not lower than the softening temperature of the thermoplastic resin, Step 21: step of carrying the molding material heated at a temperature not lower than the softening temperature between the upper mold and the lower mold of a mold for compression molding by holding it with grippers for holding at a plurality of points arranged in a carrier or in a linear state having a length which is not more than 10 times the thickness of the molding material and supporting it with the carrier, Step 22: step of pushing the molding material supported by the carrier with pushers arranged between the grippers to preform it at a preforming rate of 80 to 100%, Step 31: step of press molding the molding material by closing the upper mold and the lower mold and applying pressure to obtain the press molding and taking out the press molding from the mold by opening the mold for compression molding when the temperature of the press molding becomes lower than the softening temperature of the thermoplastic resin.

[2] The method of manufacturing a press molding in the above paragraph [1], wherein each of the grippers has a circular arc needle with an approximate curvature radius which is (the thickness of the molding material+5 mm) to (40 times the thickness of the molding material) and the circular arc needle is stuck into the molding material to hold it.

[3] The method of manufacturing a press molding in the above paragraph [2], wherein the carrier has a hand body with a plate or frame structure, the grippers and the pushers can move in a direction approaching or a direction departing from the hand body, and the grippers can move in a direction along with the hand body.

[4] The method of manufacturing a press molding in the above paragraph [3], wherein the pushers can move in a direction along with the hand body.

[5] The method of manufacturing a press molding in the above paragraph [3] or [4], wherein the hand body can be inclined at any angle.

[6] The method of manufacturing a press molding in any one of the above paragraphs [2] to [5], wherein, at the time of preforming in the step 22, preforming is carried out at a variation rate represented by the following expression of the shortest distance from the position of a circular arc needle which is one gripper or the contact position between the pusher and the molding material to the position of a circular arc needle which is another gripper or the contact position between the pusher and the molding material along the surface of the molding material of −10 to 10%, $$\text{Variation rate}=(C-D)/D\times 100(\%) \quad (1)$$

C: shortest distance from the position of one circular arc needle or the contact position between the pusher and the molding material to the position of another circular arc needle or the contact position between the pusher and the molding material along the surface of the molding material after preforming, D: shortest distance from the position of one circular arc needle or the contact position between the pusher and the molding material to the position of another circular arc needle or the contact position between the pusher and the molding material along the surface of the molding material before preforming.

[7] The method of manufacturing a press molding in any one of the above paragraphs [1] to [6], wherein the heat conductivity of the pushers is lower than the heat conductivity of the molding material, and the shape of the pushers is rod-like, pyramid-like, spherical or plate-like.

[8] The method of manufacturing a press molding in any one of the above paragraphs [2] to [7], wherein the weight average fiber length of the discontinuous carbon fibers is not less than 10 mm, and the thickness of the molding material is ½ times or more of the thickness of the circular arc needle.

[9] The method of manufacturing a press molding in any one of the above paragraphs [2] to [8], wherein at least part of the surface of the circular arc needle is coated with at least one fluorine-based resin.

[10] The method of manufacturing a press molding in any one of the above paragraphs [2] to [9], wherein water or a release agent is applied to the circular arc needle after the step 31, and the process returns to the step 11 to carry out the next press molding.

[11] The method of manufacturing a press molding of any one of the above paragraphs [1] to [10], wherein a press molding having elevation faces is produced by preforming one or more molding materials after the step 21 and before the step 31, parts of one or more molding materials are overlapped with each other to preform the elevation faces, the molding material is one molding material which has an area to be overlapped to form the elevation faces or a material obtained by dividing a molding material into a plurality of parts, and the overlapping rate of the molding material represented by the following numerical expression (2) is not less than 200%.

$$\text{Overlapping rate (\%)=maximum length of overlapped part/thickness of molding material}\times 100 \quad (2)$$

Effect of the Invention

By using the method of manufacturing a press molding of the fiber-reinforced resin composite material of the present invention, even when a product has a complex shape, preforming is made possible before the composite material is cooled on a mold for compression molding capable of cold pressing and further a press molding having a good appearance can be manufactured. The provision of the press molding obtained as described above has the effect of cutting the cost of a structural part for automobiles and ensures the reduction of the weight of a car body. The manufacturing method of the present invention is also a mass-production method which makes it possible to manufacture a large number of press moldings continuously.

PRACTICAL EMBODIMENT OF THE INVENTION

Figure 1:
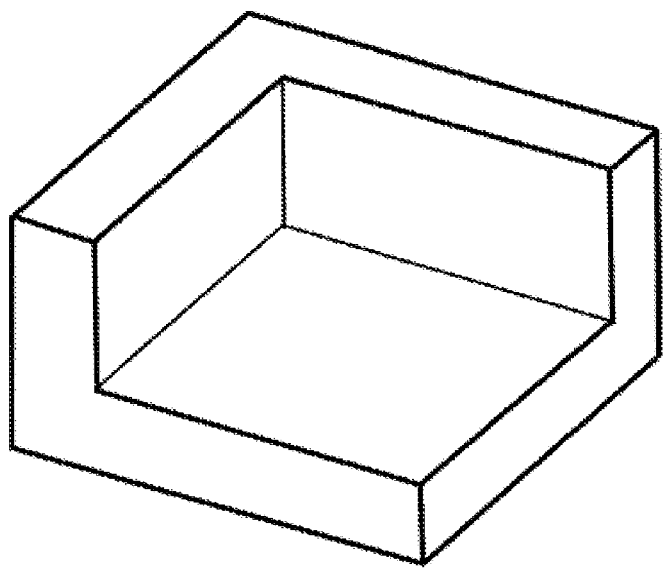
FIG. 1 shows an example of the lower mold of a mold for compression molding which includes an upper mold and a lower mold used in the method of manufacturing a press molding according to the present invention.

Practical embodiments of the present invention will be described hereinbelow.
(Molding Method)
The present invention is a method of manufacturing a press molding, comprising the following process.

After a molding material comprising reinforced fibers and a thermoplastic resin is heated to be softened, it is injected into a mold for compression molding including an upper mold and a lower mold. Then, the upper mold and the lower mold are put together, and pressure is applied to increase the pressure of a cavity in the mold for compression molding so as to make the molding material flow so that the surface of the cavity is transferred to the molding material. This is called "compression molding method" or "press molding method" in which a press molding is taken out after the temperature of the press molding formed in the mold for compression molding is cooled to a temperature lower than the softening temperature of the thermoplastic resin constituting the molding material in the end. To obtain a molding having irregularities by this press molding method, when a molding material having very high flowability is used, the molding material is filled in the entire inside area of the cavity by its flow, thereby obtaining a satisfactory molding. However, when a molding having a large complex uneven shape is to be molded from a molding material comprising a thermoplastic resin and reinforced fibers of the present invention, the flowability of the molding material becomes unsatisfactory and a molding filled completely in the cavity is hardly obtained. Preforming which is carried out in the manufacturing method of the present invention makes it possible to obtain a molding filled completely in the cavity by making the molding material flow uniformly.
(Molding Process and Carrier)
The present invention is a method of manufacturing a press molding, comprising the following steps.
Step 11: step of heating a molding material comprising discontinuous carbon fibers having a weight average fiber length of not less than 2 mm and a thermoplastic resin at a temperature not lower than the softening temperature of the thermoplastic resin
Step 21: step of carrying the molding material heated at a temperature not lower than the softening temperature between the upper mold and the lower mold of a mold for compression molding by holding it with grippers for gripping at a plurality of points arranged in a carrier or in a linear state having a length which is not more than 10 times the thickness of the molding material and supporting it with the carrier
Step 22: step of pushing the molding material supported by the carrier with pushers arranged between the grippers to preform it at a preforming rate of 80 to 100%
Step 31: step of press molding the molding material by closing the upper mold and the lower mold and applying pressure to obtain a press molding and taking out the press molding from the mold by opening the mold for compression molding when the temperature of the press molding becomes lower than the softening temperature of the thermoplastic resin The above steps used in the present invention are for press molding or compression molding, and a hydraulic or electric clamping device is used to compress and mold the molding material in a plasticized state placed in the mold for compression molding between the upper mold and the lower mold. At this point, the term "plasticized state" means that the molding material is heated at a temperature not lower than softening temperature, that is, not lower than the melting point of a crystalline thermoplastic resin or not lower than the glass transition temperature of an amorphous thermoplastic resin to have plasticity. Further, as the melting point and the glass transition temperature, values obtained by measuring the thermoplastic resin at a temperature elevation rate of 10° C./min with a scanning thermal analyzer were used. Since the molding material used in the present invention comprises a thermoplastic resin, it must be pressure formed while it retains the above plasticized state. Therefore, since pressure forming is completed before the temperature of the molding material lowers and plasticity is lost, the above steps must be completed in a short time. The term "mold for compression molding" may be simply referred to as "mold" hereinafter.

As means of carrying the molding material heated at a temperature not lower than the softening temperature into the mold, it is known that the molding material is stuck with a needle-like object to be carried. In the present invention, the molding material is preformed at the same time or right after it is carried, and preforming may become difficult while the needle-like object is stuck into the molding material. That is, the preforming operation of the present invention is the operation of pushing and bending the molding material partially while the molding material is kept stuck with the needle for carrying. In general, to stick the molding material with a linear needle and carry it, a gripper having a plurality of linear needles is used, and when the needles are inserted into the molding material in a direction orthogonal to the molding material, the linear needles must be prevented from being removed from the molding material. However, in this case, by sticking the plurality of needles in the direction orthogonal to the molding material, the molding material is fixed on a plane, whereby a part fixed on the plane and stuck with the plurality of needles and a plurality of areas therearound cannot be driven independently, thereby making it difficult to preform the molding material into the complex shape of the present invention. Therefore, the plurality of needles must not be arranged to fix the molding material on the plane but a plurality of independent gripping parts for gripping a substrate which will become a molding material at points or in a linear state having a length not more than 10 times the thickness of the molding material must be arranged on the carrier used in the present invention. It is preferred that the molding material should be held with gripping parts at points or in a linear state having a length 0.1 to 5.0 times the thickness of the molding material. By holding the molding material in this mode, the molding material can be turned in all directions with a part gripped with the gripping parts of the molding material as the center, thereby making it possible to preform the molding material into a complex shape. At this point, when the gripping part has a length larger than 10 times the thickness of the molding material, the molding material is held linearly, thereby preventing the rotation of the molding material. The number of grippers provided in the gripping part may be one or more. It is preferably 1 to 6, more preferably 2 to 4.

To hold the molding material with the above gripping parts at points or in a linear state, it is more preferred that hook needles having a curved shape including a secondary curve such as circular arc, elliptical arc or parabola should be stuck into the molding material to hold it. It is most preferred for the development of the effect of the present invention that circular arc needles should be inserted into the molding material to hold it. As the more specific shape of this circular arc needle, a circular arc needle having an approximate curvature radius which is (thickness of molding material+5 mm) to (40 times the thickness of molding material) is preferred. The approximate curvature radius is more preferably (thickness of molding material+8 mm) to (20 times the thickness of molding material). It is much more preferably (thickness of molding material+10 mm) to (15 times the thickness of molding material).

When the approximate curvature radius is less than (thickness of molding material+5 mm), the center of the rotation of the circular arc needle becomes close to the molding material, which is not preferred from the viewpoint of mechanism. When the radius of the circular arc is larger than 40 times the thickness of the molding material, the diameter of the circular arc needle becomes large and the linear part of the gripping part becomes long, whereby the effect of the present invention is not obtained. As the shape of the circular arc needle of the present invention, it is possible to suitably select from a circular arc shape formed of a sphere, a shape formed by combining a plurality of circular arcs having different or the same curvature and a shape including a straight line partially according to restrictions from mechanism. The needle may be a hook needle if it can be stuck into and removed from the molding material and does not adhere a component constituting the molding material excessively.

The above description is based on the preposition that (thickness of molding material+5 mm) is smaller than (40 times the thickness of the molding material). Theoretically, when the thickness of the molding material is smaller than 0.128 mm (=5 mm/39), a value which is 40 times the thickness of the molding material is smaller than (thickness of molding material+5 mm). In the manufacturing method of the present invention, it is not supposed to use a molding material having such a small thickness for molding. The thicknesses of the molding material, the preformed molding and the press molding in the present invention are average values obtained by measuring at arbitrarily selected 10 points to a unit of 0.1 mm with a caliper.

In the present invention, the operation of preforming the heated molding material on the mold along the surface of the mold is required. To evaluate preforming, the preforming rate is used as an index in the present invention. The preforming rate is obtained by measuring the shape of the obtained preformed molding with a stereo camera 3D measuring instrument after the preformed molding is cooled to be solidified on the mold before compression molding is carried out after preforming. The preformed molding before it is cooled to be solidified may be referred to as "first preformed molding" and the preformed molding after it is cooled to be solidified may be referred to as "second preformed molding" hereinafter. The best matching operation is carried out with the shape of the design 3D drawing of the press molding and the measurement data of the obtained second preformed molding by using a best fitting method to overlap the shape of the design 3D drawing with the shape of the second preformed molding, the area of apart separated a distance which is not less than 2 times the thickness of the molding material from the product face of the press molding in a normal direction is obtained, and the preforming rate is defined by the following numerical expression (3) from the area ratio. The best matching operation using the best fitting method will be described hereinafter.

$$\text{Preforming rate}=(A-B)/A\times100(\%) \quad (3)$$

A: surface area of a preformed molding (second preformed molding) after preforming B: area of a part separated a distance which is not less than 2 times the thickness of the molding material from the product face of a press molding in a normal direction For example, a preforming rate of 100% means that the design drawing and the preformed molding have the same shape, and a preforming rate of 0% means that the preformed molding has almost no part which is almost the same as the design drawing. In the present invention, the preforming rate evaluated by the above method is 80 to 100%, preferably 85 to 95%. When the preforming rate is lower than 80%, the intake of the molding material occurs without reproducibility at the time of clamping the mold for compression molding, which causes the reduction of the non-defective molding ratio. When the preforming rate becomes higher than 100%, depending on the shape of the molding, if a molding having an uneven shape is arranged very close to the surface of the mold, the formation of a crease occurs markedly, thereby deteriorating moldability.

To carry out the preforming of the present invention, the operation of pushing and holding the molding material must be carried out while the molding material is positioned on the lower mold of the mold for compression molding, preferably in contact with the lower mold, to dispose the molding material along the lower mold. Therefore, to carry out the present invention, pushers for pushing the molding material along the lower mold and grippers for gripping the molding are required. The pushers are preferably provided in a preforming device. The grippers are preferably provided in the gripping part. Preferably, each of the grippers has circular arc needles, and the gripping part includes a mechanism for driving the needles into the molding material. The carrier of the present invention has the above pushers and the grippers and carries the molding material onto the lower mold, and then preforming can be carried out continuously. Therefore, molding is possible without cooling and solidifying the molding material when the molding material comprising a thermoplastic resin and reinforced fibers is molded. The upper mold and the lower mold of the mold are preferably set to a suitable temperature so as to delay cooling and solidification. Further, the pushers and the grippers can move in a horizontal direction and a vertical direction with respect to the surface of the molding material lifted by the carrier above the lower mold of the mold, thereby making it possible to preform the molding material into the product shape of a press molding or the shape of the preformed molding. This mode is also preferred. Thus, since the carrier, the grippers and the pushers are thus arranged, the grippers for sticking circular arc needles into the molding material to hold it and the pushers involved in the preforming of the molding material can move in a horizontal direction and a vertical direction with respect to the product face of the lower mold of the mold for compression molding. More preferably, the grippers are provided in the gripping part, and the pushers are provided in the preforming device, thereby making it possible for them to move in the above horizontal direction and the vertical direction. The more specific operation is divided into the following steps.

Step 21: step of carrying the molding material heated at a temperature not lower than the softening temperature between the upper mold and the lower mold of a mold for compression molding by holding it with grippers for gripping at a plurality of points arranged in a carrier or in a linear state having a length which is not more than 10 times the thickness of the molding material and supporting it with the carrier Step 22: step of pushing the molding material supported by the carrier with pushers arranged between the grippers to preform it at a preforming rate of 80 to 100%

This step 22 includes:

Step 23: step of moving the pushers in a vertical direction or a horizontal direction while some grippers are moved horizontally with respect to the surface of the molding material lifted by a carrier having the other grippers above the lower mold of the mold in a state that the position of the carrier having the other grippers is fixed so as to dispose the molding material along the surface of the lower mold of the mold Step 24: step of releasing the molding material from the grippers and moving the carrier away from above the lower mold of the mold The moving directions, the moving distances and the moving timings of the grippers and the pushers in the step 23 differ according to the shape of the finally produced press molding and must be suitably adjusted. At this point, preferably, the carrier is held above the mold in parallel to the surface of the lower mold and the pushers move in a vertical direction to the product face of the mold (may be referred to as "vertical direction" hereinafter). However, this shall not apply to a case that the product face of the mold must be greatly inclined in consideration of the shape of the press molding and the draft angle or a case that the shape of the molding hardly has a flat plane as a standard like an L-shaped molding.

Although the grippers and the pushers can move in a horizontal direction and a vertical direction in the step 22, it is necessary to proceed up to the step 24 while the linear distances between grippers, between a gripper and a pusher and between pushers at the end of the step 22 are kept. The variation rate of the shortest distance from the position of a circular arc needle which is one gripper out of a pair of grippers at this point or the contact position between the pusher and the molding material to the position of a circular arc needle which is the other gripper or the contact position between the pusher and the molding material along the surface of the molding material is 0 to 10%, preferably 1 to 5%. The above variation rate can be represented by the following numerical expression (1).

$$\text{Variation rate} = (C-D)/D \times 100(\%) \quad (1)$$

C: the shortest distance from the position of one circular arc needle or the contact position between the pusher and the molding material to the position of the other circular arc needle or the contact position between the pusher and the molding material along the surface of the molding material after preforming D: the shortest distance from the position of one circular arc needle or the contact position between the pusher and the molding material to the position of the other circular arc needle or the contact position between the pusher and the molding material along the surface of the molding material before preforming When the variation rate exceeds 10%, the molding material extends or breaks at the time of preforming, thereby reducing the preforming rate of the present invention and the reproducibility of the preforming rate. By attaining the above numeral range of the preforming rate, a press molding having a good appearance and mass-productivity can be manufactured. Further, by setting the variation rate to the above numerical range, the effect of the present invention can be more preferably attained.

Each of the pushers needs to push the heated molding material toward the product face of the lower mold of the mold. When the pusher pushes the molding material, the tip of the pusher is brought into direct contact with the heated molding material, whereby the molding material may be cooled. Therefore, the heat conductivity of the pusher pushing the molding material at the time of preforming is preferably lower than the heat conductivity of the molding material. When a material having high heat conductivity is used with the pusher, a part in contact with the pusher of the molding material is cooled, whereby the molding material may not change its shape completely at the time of preforming and press molding with the result that the surface appearance of the press molding may deteriorate. Since most of the surface of the molding material is covered with the thermoplastic resin, the pusher is preferably made of a thermoplastic resin or thermosetting resin from the viewpoint of heat conductivity. This pusher is desirably detached and separated from the preformed molding material right after the end of preforming.

From this point of view, the material of a part for pushing the molding material, specifically a part in direct contact with the heated molding material is preferably a fluorine-based resin having heat resistance, high chemical resistance and a small wear coefficient, specifically polytetrafluoroethylene (PTFE), tetrafluoroethylene-perfluoroalkyl vinyl ether copolymer (PFA), polychlorotrifluoroethylene (PCTFE), vinylidene polyfluoride (PVDF), vinyl polyfluoride (PVF), tetrafluoroethylene-hexafluoropropylene copolymer (FEP), tetrafluoroethylene-ethylene copolymer (PETFE) or ethylene-chlorotrifluoroethylene copolymer (ECTFE). They may be used alone or in combination.

The shape of the above pusher is preferably rod-like, pyramid-like, spherical, semispherical or plate-like. The rod-like shape is preferably rectangular column-like, cylindrical or elliptically cylindrical, and the pyramid-like shape is preferably truncated pyramid-like or truncated conical. Further, the contact area between the pusher and the molding material must be reduced. Therefore, the contact surface with the molding material is preferably circular, semispherical or spherical.

The discontinuous carbon fibers in the thermoplastic resin molding material used in the present invention have a weight average fiber length of preferably 2 to 500 mm, more preferably 5 to 100 mm, much more preferably 10 to 30 mm. The carbon fibers having a weight average fiber length of 2 to 500 mm may be referred to as "discontinuous carbon fibers" hereinafter.

If the weight average fiber length is smaller than 2 mm, when the gripping part which is circular arc needles used in the present invention is stuck into the molding material to lift it, the molding material extends with a part stuck with the needles as the center or the molding material is broken, making it difficult to carry it. It is preferred that the thickness of the molding material should be not less than ½ of the thickness of the circular arc needle. When the thickness of the molding material is less than ½ of the thickness of the circular arc needle, it is difficult to insert the needle into the molding material and lift the molding material stably.

In the present invention, the circular arc needle needs the functions of moving the molding material to a predetermined position when the circular arc needle lifts the molding material and preforming is carried out and holding the molding material to prevent the molding material from shifting when it is pushed by the preforming device. At this point, the molten thermoplastic resin may adhere to the surface of this needle. When the molten thermoplastic resin adheres to the surface of the needle, the detachability (separability) of the molding material from the needle degrades and it is difficult for the gripper which moves to a suitable position to release the molding material. Therefore, it is effective in the development of the effect of the present invention to prevent the adhesion of the molten thermoplastic resin by carrying out a surface treatment on at least part of the surface of the circular arc needle.

As means of treating at least part of the surface of the circular arc needle, various release coating agents are known but coating with a fluorine-based resin is preferred from the viewpoints of durability and a delamination effect. It is preferred that the entire surface of the needle should be coated, and it is more preferred that a part in contact with the molding material should be coated. As the fluorine-based resin in use, PTFE, PFA, PCTFE, PVDF, PVF, FEP, PCTFE and ECTFE may be used alone or in combination. As for the coating method, varnish or a dispersion containing the fluorine-based resin is applied to the surface of the circular arc needle of the present invention, the solvent is removed (dried), and the coating film is cured or sintered.

Another means of preventing the adhesion of the molten resin to the circular arc needle, before the needle is stuck into the heated molding material, the adhesion of the molten resin is prevented by applying an aqueous emulsion type release agent or water to the circular arc needle. Examples of the aqueous emulsion type release agent include silicone-based, fluorine-based and alkyl polymer-based release agents. Alkyl polymer-based release agents having especially low transferability are preferred to prevent contamination into the process. Polymer having along alkyl side chain are preferred, and copolymers of an alkyl acrylate having an alkyl group with 12 or more carbon atoms, especially 16 to 20 carbon atoms, and acrylic acid are more preferred. When the number of carbon atoms of the alkyl chain of the alkyl acrylate is less than 12, satisfactory detachability may not be obtained. Copolymers obtained by long-chain alkylating a polyvinyl alcohol or polyethyleneimine with chlorinated alkyloyl or alkyl isocyanate are particularly preferred. Release agents obtained by emulsifying these polymers with a surfactant are used. The effect of preventing the adhesion of the molten resin is also obtained by applying water. However, in this case, the heated molding material must be stuck with the needle while water droplets adhere to the surface of the needle. It is preferred that the application of the release agent or water to the circular arc needle should be carried out after the step of manufacturing a press molding at least one time (the above step 31) and then the routine should be back to the above step 11 to carry out the next press molding from the viewpoint of making water and the release agent function surely. A desired press molding can be manufactured continuously by doing so.

In the present invention, after the step 21, preforming is carried out. However, to preform a three-dimensional shape having elevation faces such as a corner formed by three opposing faces, it is necessary to carry out preforming by making cuts in the molding material and overlapping parts of one or more molding materials. At this point, the overlapping rate represented by the following numerical expression (2) of the molding material is not less than 200%, preferably 200 to 1,200%, more preferably 300 to 1,000%, much more preferably 350 to 900%.

Overlapping rate (%)=maximum length of overlapped part/thickness of molding material×100 (2)

The maximum length of the overlapped part represents the maximum length of a part overlapped with another part of the molding material after preforming and compression molding. This overlapped part is an overlapped part of a molding material when two molding materials are put together after preforming and compression molding though the molding material is not overlapped before preforming and compression molding. That is, this corresponds to a paste margin when a three-dimensional shape is formed from a planar development plan. The two molding materials may be obtained from one molding material before preforming or two separate molding materials. The above maximum length of the overlapped part is the maximum length of a line drawn from a boundary line between the overlapped part and a part which will become the product face of the press molding to the end of the overlapped part in the vertical direction out of the overlapped parts of the two molding materials. Even when the shape of the overlapped part is trapezoidal or triangular, if the maximum length of the above overlapped part remains unchanged, the overlapping rate becomes the same value. When there are a plurality of overlapped parts, the maximum lengths of the overlapped parts are calculated, the minimum value out of these is adopted as a representative value, and the calculated overlapping rate preferably falls within the above numerical range. More preferably, when there are a plurality of overlapped parts, the overlapping rate obtained from the maximum lengths of all the overlapped parts preferably falls within the above numerical range.

By setting the overlapping rate to this range, the strength of the overlapped part of the molding material achieves a satisfactory value as compared with the strength of a non-overlapped part advantageously. As for preforming, one molding material may be preformed, or two or more molding materials may be laminated together and preformed in one step 22.

Figure 2:
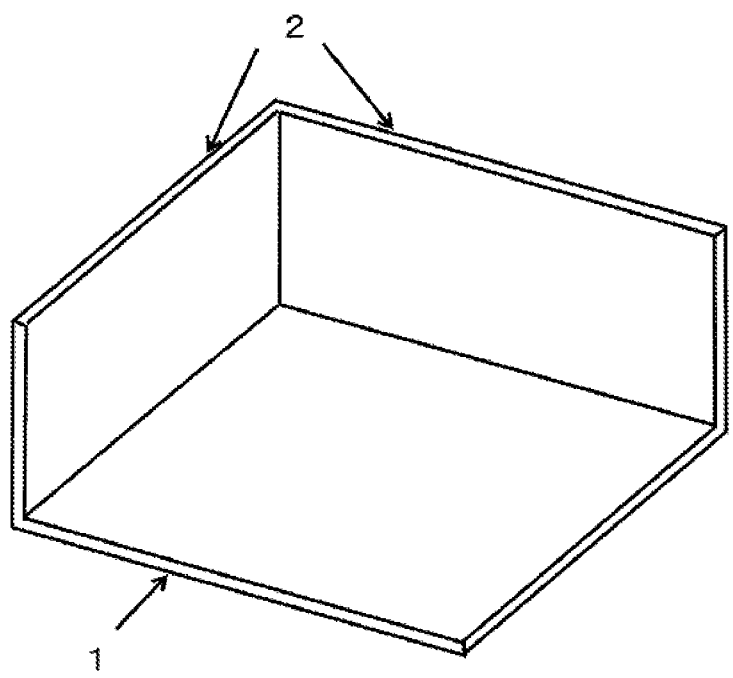
FIG. 2 shows an example of a press molding product obtained by the method of manufacturing a press molding according to the present invention by using the lower mold of the mold for compression mold shown in FIG. 1.
Figure 3:
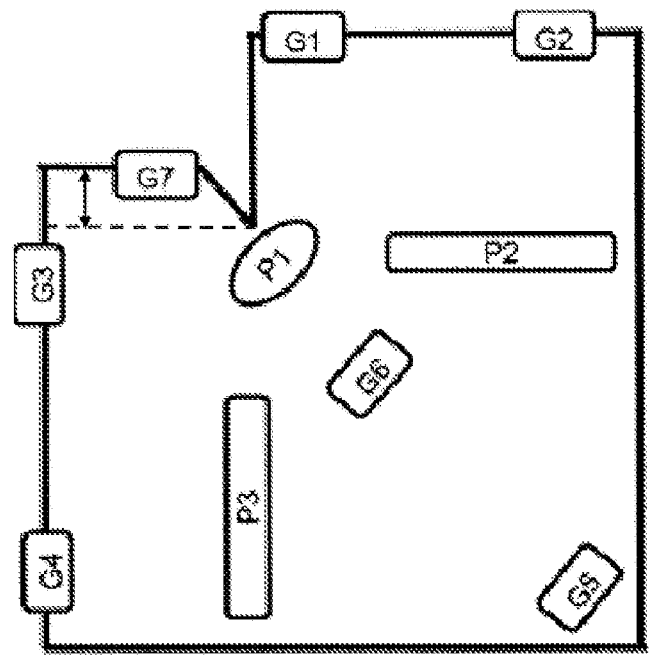
FIG. 3 is a drawing showing the positions of grippers and pushers represented by rectangles and ellipses having numerical codes therein on a molding material before press molding after cutting and used in the method of manufacturing a press molding according to the present invention.
Figure 4:
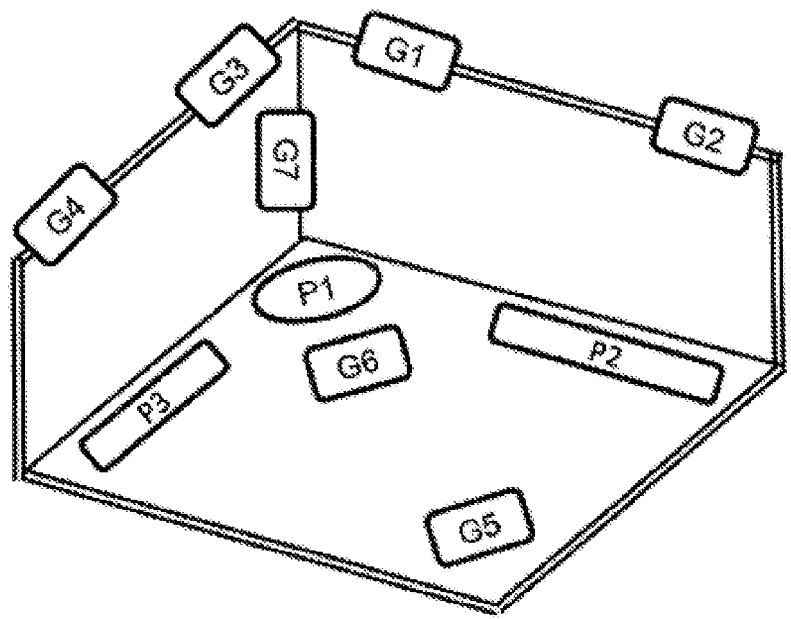
FIG. 4 is a drawing showing the positions of grippers and pushers represented by rectangles and ellipses having numerical codes therein on a press molding product obtained by the method of manufacturing a press molding according to the present invention.
Figure 5:
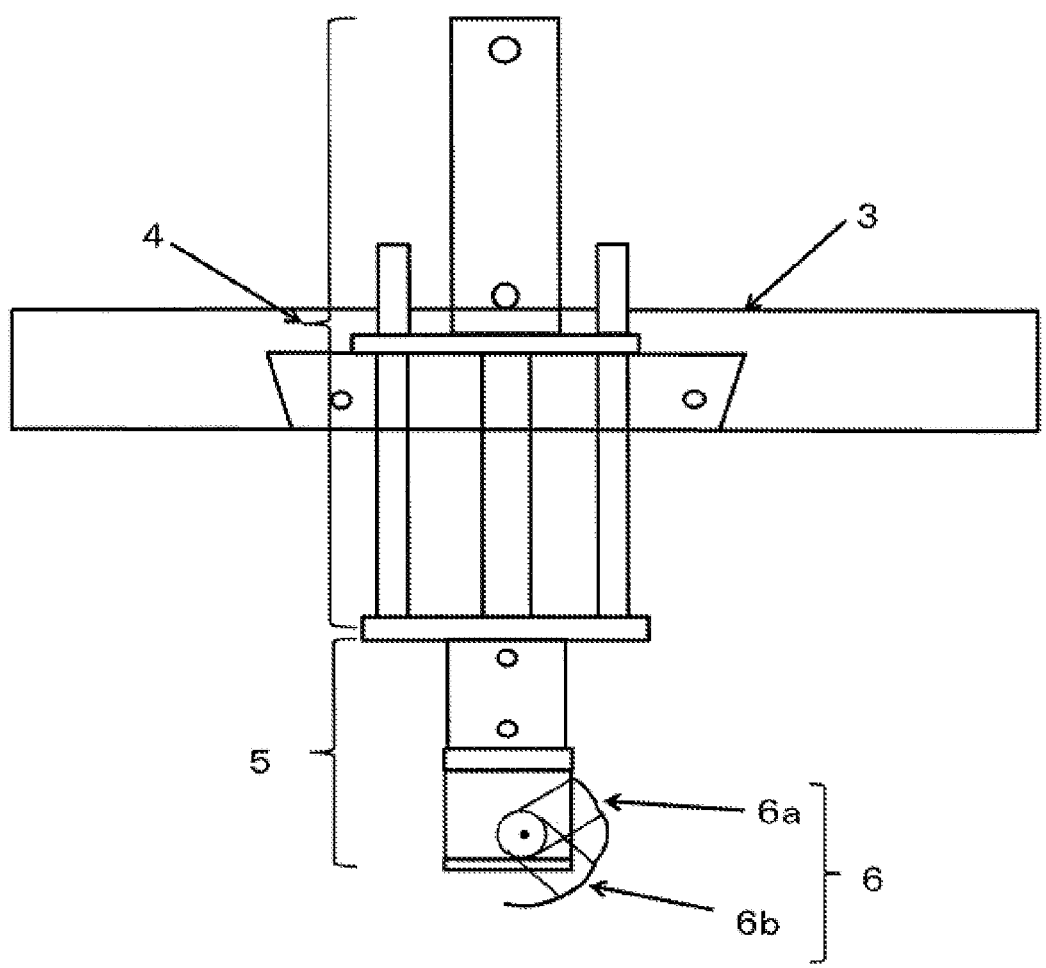
FIG. 5 shows examples of a gripping part having grippers and carriers used in the method of manufacturing a press molding according to the present invention.

A detailed description is subsequently given of the operation of the carrier in the method of manufacturing a press molding of the present invention with reference to the drawings. FIG. 1 shows an example of the lower mold of a mold for compression molding used in the manufacturing method of the present invention. The unshown upper mold of the mold has a convex part corresponding to a concave part existent at the center of the lower mold. FIG. 2 shows an example of a press molding obtained by press molding with the mold for compression molding shown in FIG. 1. This press molding has one bottom face 1 and two elevation faces 2. The external shape shown in FIG. 3 represents the shape of the molding material which was cut before press molding and consists of parts which will become the bottom face 1 and the elevation faces 2 of the press molding and a part to be overlapped at the time of molding. In FIG. 3, rectangles and ellipses represent the contact positions of the grippers provided in the gripping part and the pushers provided in the preforming device, respectively, when the molding material is carried and preformed. FIG. 4 shows a press molding obtained from the molding material shown in FIG. 3 through a preforming step and a press molding step. Like FIG. 3, rectangles and ellipses represent the contact positions of the grippers provided in the gripping part and the pushers provided in the preforming device, respectively, when the molding material is carried and preformed. Details will be described hereinafter. FIG. 5 shows a gripping part 5 provided with a gripper 6 and carriers 3 and 4. The carrier 3 is provided to move the gripping part 5 and the carrier as a single unit in a horizontal direction (for example, crosswise direction and front-back direction with respect to the paper showing FIG. 5). The carrier 4 is provided to move the gripping part 5 and the carrier as a single unit in a vertical direction (for example, vertical direction with respect to the paper showing FIG. 5). The gripping part 5 has the gripper 6 and incorporates a mechanism (not shown) for operating the gripper. The gripper 6 can take a first position 6a and a second position 6b. The first position 6a is a position when the gripping part 5 is operated without holding and carrying the molding material and the second position 6b is a position when the molding material is carried or preformed. The gripper can turn clockwise or counterclockwise so that it can take the first position 6a or the second position 6b. One carrier may have a gripping part having one or more grippers according to the shape of a press molding to be preformed and compression molded after that. More preferably, the carrier has a gripping part having 1 to 4 grippers.

Figure 6:
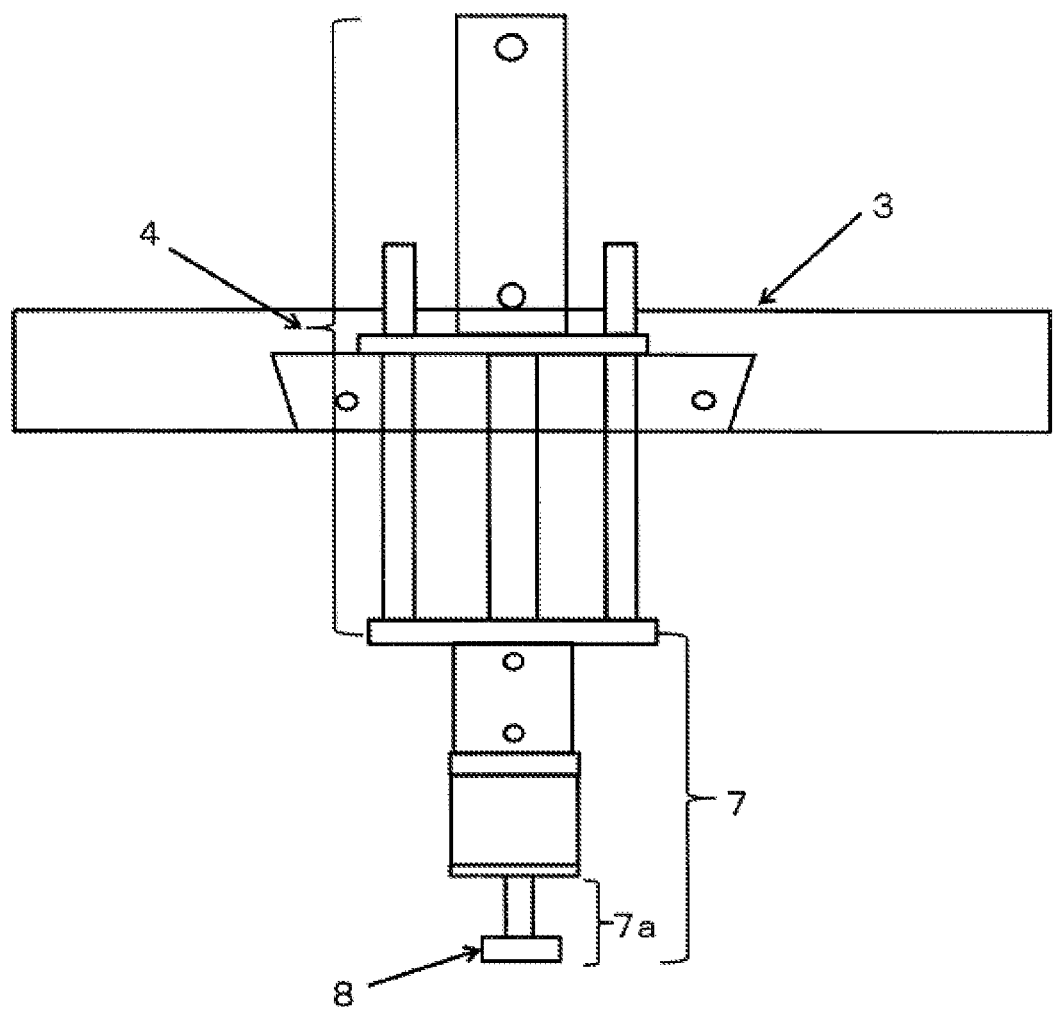
FIG. 6 shows examples of a preforming device (before operation) having pushers and carriers used in the method of manufacturing a press molding according to the present invention.
Figure 7:
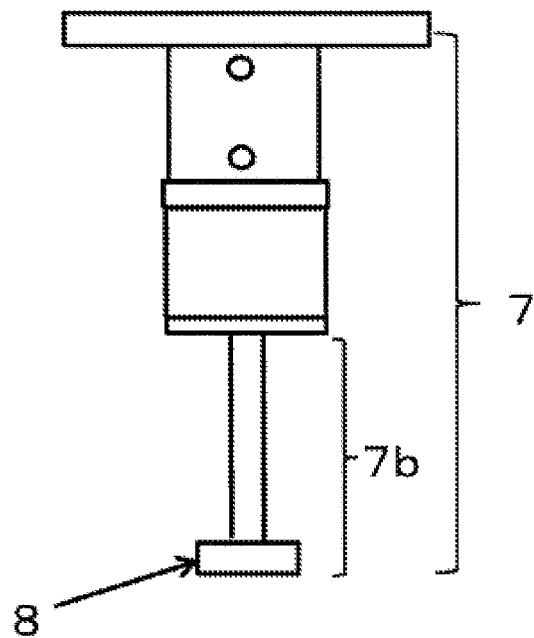
FIG. 7 shows an example of a preforming device (during operation) having pushers used in the method of manufacturing a press molding according to the present invention.

FIG. 6 and FIG. 7 show a preforming device. The preforming device 7 is installed on the carriers 3 and 4 like the gripping part and can move in a horizontal direction and a vertical direction. The preforming device 7 has a pusher 8 at the tip in place of the gripper 6. The preforming device 7 incorporates a mechanism (not shown) for operating the pusher 8. The preforming device shown in FIG. 6 is provided to move the pusher in a vertical direction (for example, vertical direction to the paper showing FIG. 6). The preforming device 7 can take a first position 7a shown in FIG. 6, a second position 7b shown in FIG. 7 and a position (third position) between them. The first position 7a is a position when the preforming device 7 is out of operation, the second position 7b is a position when the preforming device 7 operates up to the limit of the operation of the preforming device. The third position is a position when the preforming device operates in an area between the first position 7a and the second position 7b. The preforming device shown in FIG. 7 is also provided on the carriers 3 and 4 as in FIG. 6 though they are not shown. When it is operated, part of the preforming device extends as shown in FIG. 7, and the pusher 8 is brought into contact with the surface of the heated molding material at the second position or the third position to preform it. Since preforming is carried out on the molding material held by a plurality of grippers, the pusher is arranged between the grippers. FIG. 6 and FIG. 7 show that the operation direction of the pusher is a vertical direction. The operation direction of the pusher is not limited to the vertical direction and may be a horizontal direction. According to the shape of a press molding to be preformed and compression molded after that, one carrier may have a preforming device having one or more pushers. A plurality of preforming devices can be moved in a vertical direction and a horizontal direction independently or at each independent timing by the carriers 3 and 4 according to the shape of a press molding to be obtained.

Figure 8:
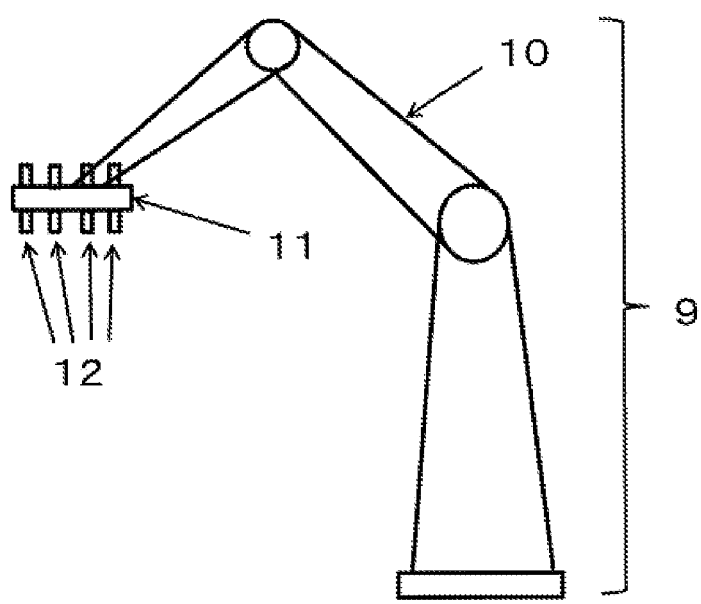
FIG. 8 shows an example of a carrier robot having a hand body used in the method of manufacturing a press molding according to the present invention.

As one operation example of the gripper when it carries the molding material, the following mode can be given. In the manufacturing method of the present invention, one or more carrier robots 9 shown in FIG. 8 may be used. The carrier robot 9 has an arm 10 with a hand body 11 at the tip of the arm. The hand body 11 is provided with one or more carriers 12 (may be referred to as "carriers having devices" hereinafter) having a gripping part with one or more grippers and a preforming device with one or more pushers. The above hand body 11 has a mechanism which can incline the hand body 11 at any angle when the arm 10 is driven in vertical, crosswise and front-back directions. Preferably, the hand body employs a plate structure or frame structure so that it can have one or more carriers having devices. The above grippers and the above pushers are preferably constituted such that they can move in a direction approaching or a direction departing from the hand body. That is, the above grippers and the above pushers are preferably constituted such that they can move in a direction approaching or a direction departing from a flat surface or curved surface including the hand body. Further, the above grippers are preferably constituted such that they can move in a direction along with the hand body. That is, the above grippers are preferably constituted such that they can move over a flat surface or curved surface having a specific and the same distance from the flat surface or curved surface including the hand body. The above pushers are preferably constituted such that they can move in a direction along with the hand body as well.

When the gripping part moves in the direction of the heated molding material from the initial position by the carriers 3 and 4, the gripper is situated at the position 6a. When the gripping part 5 reaches a position right above the predetermined position of holding the molding material, the carrier 3 stops and only the carrier 4 is driven to move down the gripping part 5 to a position where the gripping part 5 almost comes into contact with the molding material. Then, after the carrier 4 stops, as soon as the gripper turns and reaches the position 6b from the position 6a, the tip of the gripper is stuck into the molding material to hold it. Subsequently, the carriers 3 and 4 are re-started to move the molding material held by the gripping part to a position between the upper mold and the lower mold of the mold for compression molding while the shape of the molding material is maintained. The moved molding material is mounted on the lower mold of the mold. Further, the preforming device provided on a carrier which is the same or different from the carrier moving the molding material operates to change from the state 7a to the state 7b. At the same time, the pusher 8 operates to push the molding material so as to preform it into a predetermined shape along the mold for compression molding. Finally, after the end of preforming, the pusher 8 in contact with the molding material departs from the molding material, the preforming device returns to the state 7a from the state 7b, and the gripper returns to the position 6a from the position 6b to release the molding material therefrom. Then, the routine proceeds to the preparation of compression molding. The movement content of the hand body 11, the movement content in horizontal and vertical directions of the carriers, the movement content and moving timing of the gripping part/grippers, and the movement content and moving timing of the preforming device/pushers are programmed in advance to ensure that the above operations can be carried out surely and continuously.

Operation examples shown in Examples and Comparative Examples which will be described hereinafter are such examples.

(Molding Material)

The molding material used in the present invention comprises carbon fibers and a thermoplastic resin as a matrix resin. That is, a material comprising carbon fibers which are a type of reinforced fibers added to reinforce the strength of the material and a thermoplastic resin integrated with the carbon fibers is substantially used. The carbon fibers constituting the molding material of the present invention may be referred to as "reinforced fibers" hereinafter.

The amount of the matrix resin in the molding material may be suitably determined according to the type of the matrix resin and the type of the reinforced fibers. In general, the amount of the matrix resin is 3 to 1,000 parts by weight based on 100 parts by weight of the reinforced fibers. It is more preferably 30 to 200 parts by weight, much more preferably 30 to 150 parts by weight. When the amount of the matrix resin is smaller than 3 parts by weight based on 100 parts by weight of the reinforced fibers, the amount of dry reinforced fibers which are not fully impregnated with the matrix resin may increase. When the amount of the matrix resin is larger than 1,000 parts by weight, the amount of the reinforced fibers becomes too small as compared with the matrix resin, thereby obtaining a material which is hardly said to have sufficiently high strength as a structural material.

Examples of the orientation state of the reinforced fibers in the molding material include a unidirectional orientation state in which the long-axis directions of the reinforced fibers are oriented in one direction and a 2-dimensional random orientation state in which the above long-axis directions are oriented at random in the in-plane direction of the fiber-reinforced resin.

The orientation state of the reinforced fibers in the present invention may be any one of the above unidirectional orientation and 2-dimensional random orientation. Further, it may be intermediate orientation between the above unidirectional orientation and the 2-dimensional random orientation (the long-axis directions of the reinforced fibers are oriented not completely in one direction and not completely at random). Further, the long-axis directions of the reinforced fibers may be oriented to have an angle with respect to the in-plane direction of the isotropic molding material or may be oriented such that the reinforced fibers are intertangled with one another like cotton according to the average fiber length of the reinforced fibers. Further, the reinforced fibers may be oriented like a bidirectional fabric such as plain fabric or twill fabric, multi-axis fabric, nonwoven fabric, mat, knitted fabric, braid or paper.

In the present invention, one type of the molding material is an isotropic material. The isotropic material is a material in which reinforced fibers are oriented at random in one in-plane direction out of three planes extending in the 3-dimensional space of the isotropic molding material. This isotropic material tends to achieve a well-balanced design when a fiber-reinforced resin impact absorbing material is designed since the isotropic material has isotropic impact absorbing performance.

This isotropic material can be made by integrating a matrix resin with a reinforced fiber mat in which reinforced fibers are arranged isotropically. The reinforced fiber mat is a mat formed by piling up or intertwining reinforced fibers. An example of the reinforced fiber mat is a 2-dimensional random reinforced fiber mat in which the long-axis directions of reinforced fibers are oriented at random in the in-plane direction of the isotropic molding material. Another example is a 3-dimensional random reinforced fiber mat in which reinforced fibers are intertangled with one another like cotton so that the long-axis directions of the reinforced fibers are oriented at random in X, Y and Z directions in a 3-dimensional space.

The isotropic molding material in the present invention is obtained by integrating a thermoplastic resin as a matrix resin with a reinforced fiber mat. To integrate the thermoplastic resin with the reinforced fiber mat in the isotropic material in the present invention, the following method may be employed. For example, in a mode in which a powdery, fibrous or bulk thermoplastic resin is contained in the reinforced fiber mat or in a mode in which a thermoplastic resin layer in the form of a sheet or film containing a thermoplastic resin is formed or laminated on the reinforced fiber mat, the obtained mat is heated to impregnate the reinforced fiber mat with the thermoplastic resin after that.

In the isotropic molding material used in the present invention, reinforced fibers having different orientation states may be contained in one isotropic molding material.

Examples of the above mode in which reinforced fibers having different orientation states are contained in one isotropic molding material include (i) one in which reinforced fibers having different orientation states are arranged in the in-plane direction of the isotropic molding material and (ii) one in which reinforced fibers having different orientation states are arranged in the thickness direction of the isotropic molding material. When the isotropic molding material has a laminate structure consisting of multiple layers, (iii) a mode in which the orientation states of reinforced fibers contained in these layers are different is also included. A mode which is a combination of the above modes (i) to (iii) is further included. This mode is, for example, that a layer in which reinforced fibers are oriented in one direction and a layer in which reinforced fibers are oriented at random two-dimensionally are laminated together. When three or more layers are laminated together, a sandwich structure formed by an arbitrary core layer and skin layers formed on the front and rear sides of the core layer may be employed. When the isotropic molding material used in the present invention has a laminate structure consisting of multiple layers, the above thickness does not indicate the thickness of each layer but the thickness of the whole isotropic molding material which is the total thickness of these layers.

The orientation mode of the reinforced fibers in the isotropic molding material can be checked by the following method. For example, a tensile test is made to measure tensile elastic moduli in an arbitrary direction and a direction orthogonal to this direction of the isotropic molding material as standards so as to obtain a ratio (Eδ) by dividing a larger one by a smaller one out of the tensile elastic modulus measurement values. As this elastic modulus ratio is closer to 1.0, it can be evaluated that reinforced fibers are oriented isotropically. When the ratio obtained by dividing a larger elastic modulus by a smaller elastic modulus in two directions orthogonal to each other is not more than 2.0, it is evaluated that the molding material is isotropic and when the ratio is not more than 1.3, it is evaluated that the molding material is excellent in isotropy.

The weight of the reinforced fibers in the isotropic molding material is preferably 25 to 10,000 g/m². The isotropic molding material used in the present invention may contain additives such as fibrous or non-fibrous filler for organic fibers or inorganic fibers except for the above reinforced fibers, flame retardant, UV resistant agent, stabilizer, release agent, pigment, softening agent, plasticizer and surfactant as long as the object of the present invention is not damaged.

(Reinforced Fibers)

As the type of the reinforced fibers used in the present invention, carbon fibers are mainly used but another type of reinforced fibers may be contained as long as the physical properties of the isotropic molding material are not impaired. Stated more specifically, the type of the reinforced fibers may be suitably selected according to the type of the matrix resin and the intended use of the isotropic molding material. Therefore, as the reinforced fibers used in the present invention, inorganic fibers and organic fibers may be advantageously used.

Examples of the above inorganic fibers include activated carbon fibers, graphite fibers, glass fibers, tungsten carbide fibers, silicon carbide fibers, ceramic fibers, alumina fibers, natural fibers, mineral fibers such as basalt, boron fibers, boron nitride fibers, boron carbide fibers and metal fibers.

Examples of the above metal fibers include aluminum fibers, copper fibers, brass fibers, stainless steel fibers and steel fibers.

Examples of the above glass fibers include E glass, C glass, S glass, D glass, T glass, quartz glass fibers and borosilicate glass fibers.

Examples of the above organic fibers include fibers of resin materials such as polyaramide, polyparaphenylene benzoxazole, polyphenylene sulfide, polyester, polyacryl, polyamide, polyolefin, polyvinyl alcohol and polyarylate.

In the present invention, two or more different types of reinforced fibers may be used in combination. In this case, different types of inorganic fibers, different types of organic fibers, or inorganic fibers and organic fibers may be used in combination with carbon fibers.

When different types of inorganic fibers are used in combination, for example, carbon fibers and metal fibers are used in combination, or carbon fibers and glass fibers are used in combination. When different types of organic fibers are used in combination, for example, aramid fibers and fibers of another organic material are used in combination. Further, when inorganic fibers and organic fibers are used in combination, for example, carbon fibers and aramid fibers are used in combination.

In the present invention, carbon fibers are preferably used as the above reinforced fibers. This is because the carbon fibers can provide an isotropic molding material which is lightweight and has excellent strength. In the present invention, the content of the carbon fibers in the reinforced fibers contained in the isotropic molding material is preferably 70 to 100 wt %, more preferably 80 to 99 wt %.

As the above carbon fibers, there are generally known polyacrylonitrile (PAN)-based carbon fibers, petroleum coal pitch-based carbon fibers, rayon-based carbon fibers, cellulose-based carbon fibers, lignin-based carbon fibers, phenol-based carbon fibers and vapor-grown carbon fibers. In the present invention, all the above carbon fibers may be advantageously used.

Out of these, PAN-based carbon fibers having excellent tensile strength are preferably used in the present invention. When PAN-based carbon fibers are used as the reinforced fibers, the tensile elastic modulus of the fibers is preferably 100 to 600 GPa, more preferably 200 to 500 GPa, much more preferably 230 to 450 GPa. The tensile strength of the fibers is preferably 2,000 to 10,000 MPa, more preferably 3,000 to 8,000 MPa.

The reinforced fibers used in the present invention may have a sizing agent adhered to the surface in order to improve adhesion to the matrix resin. When the reinforced fibers having the sizing agent adhered thereto are used, the type of the sizing agent can be suitably selected according to the types of the reinforced fibers and the matrix resin.

Adhesion strength between the reinforced fibers and the matrix resin is desirably not less than 5 MPa in a strand tensile shear test. This strength can be improved by changing the surface oxygen concentration ratio (O/C) of carbon fibers or by applying the sizing agent to carbon fibers to enhance adhesion strength between the carbon fibers and the matrix resin in addition to the selection of the matrix resin.

The fiber length of the reinforced fibers used in the present invention can be suitably determined according to the type of the reinforced fibers, the type of the matrix resin and the orientation state of the reinforced fibers in the isotropic molding material. Therefore, continuous fibers or discontinuous fibers may be used according to the purpose of the present invention. When discontinuous fibers are used, the average fiber length is generally 2 to 500 mm but preferably 5 to 100 mm, more preferably 10 to 30 mm in the present invention.

In the present invention, reinforced fibers having different average fiber lengths may be used in combination. In other words, the reinforced fibers used in the present invention may have a single peak or multiple peaks in a fiber length distribution. The average fiber length of the reinforced fibers can be obtained, for example, from the following numerical expressions (4) and (5) by measuring the fiber lengths of 100 fibers extracted at random from the isotropic molding material to a unit of 1 mm with a caliper. The method of extracting the reinforced fibers from the isotropic molding material can be carried out by heating the isotropic molding material at 500° C. for about 1 hour to remove the resin in a furnace.

$$\text{Number average fiber length: } Ln=\Sigma Li/j \quad (4)$$

(Li: fiber length of single fiber of reinforced fibers, j: number of reinforced fibers)

$$\text{Weight average fiber length: } Lw=(\Sigma Li^2)/(\Sigma Li) \quad (5)$$

When the fiber length is a fixed length, for example, by cutting the reinforced fibers with a rotary cutter, the number average fiber length and the weight average fiber length become extremely close to each other.

Although either one of the number average fiber length and the weight average fiber length may be adopted in the present invention, the weight average fiber length can reflect the physical properties of the isotropic molding material more accurately in most cases. The fiber diameter of the reinforced fibers used in the present invention may be suitably determined according to the type of the reinforced fibers. For example, when carbon fibers are used as the reinforced fibers, the average fiber diameter is preferably 3 to 50 μm, more preferably 4 to 12 μm, much more preferably 5 to 8 μm.

When glass fibers are used as the reinforced fibers, the average fiber diameter is preferably 3 to 30 m. The above average fiber diameter indicates the diameter of the single fiber of the reinforced fibers. Therefore, when the reinforced fibers are a bundle of fibers, the average fiber diameter indicates the diameter of a reinforced fiber (single fiber) constituting a bundle of fibers and not the diameter of a bundle of fibers. The average fiber diameter of the reinforced fibers can be measured by a method specified in JIS R7607. The reinforced fibers used in the present invention may be in a single fiber form consisting of single fibers or a bundle of fibers consisting of a plurality of single fibers regardless of the type thereof.

The reinforced fibers used in the present invention may be composed of single fibers, a bundle of fibers or a mixture thereof. The "bundle of fibers" as used herein means that two or more single fibers are existent in proximity to one another by a sizing agent or electrostatic force. When a bundle of fibers is used, the number of single fibers constituting each bundle of fibers may be almost the same or different. When the number of single fibers increases, the mechanical strength of the isotropic molding material becomes high and moldability typified by flowability tends to degrade.

When the reinforced fibers used in the present invention are bundles of fibers, the number of single fibers constituting each bundle is generally several to 100,000. In general, carbon fibers are fiber bundles, each consisting of several thousands to several ten thousands of filaments. When carbon fibers are used as the reinforced fibers, if the carbon fibers are used directly, the interlaced part of fiber bundles becomes locally thick, thereby making it difficult to obtain a thin isotropic molding material. Therefore, when carbon fibers are used as the reinforced fibers, the bundles of fibers are generally expanded in width or opened before use.

(Matrix Resin)

As the matrix resin used in the present invention, any matrix resin may be preferably used if an isotropic molding material having desired strength can be obtained therefrom and may be suitably selected according to the intended use of the isotropic molding material. In general, as a typical matrix resin used in the isotropic molding material, there is known a thermoplastic resin or a thermosetting resin. In the present invention, a thermoplastic resin may be advantageously used as the matrix resin. In the present invention, a thermosetting resin may be used in combination if a thermoplastic resin is used as the main component of the matrix resin. The amount of the thermosetting resin is preferably 0 to 20 parts by weight, more preferably 5 to 15 parts by weight based on 100 parts by weight of the thermoplastic resin.

As the above thermoplastic resin, a thermoplastic resin having a desired softening temperature or melting point is suitably selected according to the intended use of the isotropic molding material. As the above thermoplastic resin, a thermoplastic resin having a softening temperature of 180 to 350° C. is preferably used.

The above thermoplastic resin is selected from polyolefin resin, polystyrene resin, polyamide resin, polyester resin, polyacetal resin (polyoxymethylene resin), polycarbonate resin, (meth)acrylic resin, polyarylate resin, polyphenylene ether resin, polyimide resin, polyether nitrile resin, phenoxy resin, polyphenylene sulfide resin, polysulfone resin, polyketone resin, polyether ketone resin, thermoplastic polyurethane resin, fluorine-based resin and thermoplastic polybenzimidazole resin.

Examples of the above polyolefin resin include polyethylene resin, polypropylene resin, polybutadiene resin, polymethyl pentene resin, vinyl chloride resin, vinylidene chloride resin, vinyl acetate resin and polyvinyl alcohol resin.

Examples of the above polystyrene resin include polystyrene resin, acrylonitrile-styrene resin (AS resin) and acrylonitrile-butadiene-styrene resin (ABS resin).

Examples of the above polyamide resin include polyamide 6 resin (nylon 6), polyamide 11 resin (nylon 11), polyamide 12 resin (nylon 12), polyamide 46 resin (nylon 46), polyamide 66 resin (nylon 66) and polyamide 610 resin (nylon 610).

Examples of the above polyester resin include polyethylene terephthalate resin, polyethylene naphthalate resin, polytrimethylene terephthalate resin, polytrimethylene naphthalate resin, polybutylene terephthalate resin, polybutylene naphthalate resin, polylactic acid resin and liquid crystal polyesters.

Examples of the above (meth)acrylic resin include polyacrylic resin, polymethacrylic resin, polymethyl methacrylate and polymethyl acrylate.

Examples of the above modified polyphenylene ether resin include polyphenylene ether resin and modified polyphenylene ethers.

Examples of the above thermoplastic polyimide resin include thermoplastic polyimide, polyamide-imide resin, polyether imide resin and polyester imide resin.

Examples of the above polysulfone resin include polysulfone resin, modified polysulfone resin, polyether sulfone resin, polyether phenylene sulfone resin and polyether ketone sulfone resin.

Examples of the above polyether ketone resin include polyether ketone resin, polyether ether ketone resin and polyether ketone ketone resin.

Examples of the above fluorine-based resin include polymonofluoroethylene resin, polybisfluoroethylene resin, polytrifluoroethylene resin and polytetrafluoroethylene.

The above thermoplastic resins may be used alone or in combination of two or more in the present invention. When two or more thermoplastic resins are used in combination, thermoplastic resins having different glass transition temperatures or melting points, or thermoplastic resins having different weight average molecular weights may be used in combination. The present invention is not limited to these.

(Method of Manufacturing Isotropic Molding Material)

The isotropic molding material used in the present invention can be manufactured by using a known method. When a thermoplastic resin is used as the matrix resin, the isotropic molding material can be manufactured, for example, through 1. the step of cutting reinforced fibers, 2. the step of opening the obtained reinforced fibers, 3. the step of mixing together the opened reinforced fibers with the matrix resin and heat compressing the mixture to obtain a prepreg, and 4. the step of molding the prepreg. However, the present invention is not limited to this method.

The isotropic material and the production method thereof are described, for example, in WO2012/105080 and JP-A 2013-49298 of the Japan Patent Office. That is, a random mat can be obtained by slitting a strand composed of a plurality of reinforced fibers continuously in a fiber length direction as required to obtain a plurality of fine strands having a width of 0.05 to 5 mm, cutting the fine strands continuously to achieve a weight average fiber length of 2 to 500 mm, and depositing the obtained reinforced fibers in the form of a layer on an air-permeable conveyor net while a gas is blown against the obtained reinforced fiber bundles to open them. The isotropic material containing a thermoplastic resin can also be manufactured by depositing a granular or short-fiber thermoplastic resin and reinforced fibers on an air-permeable conveyor net or by supplying a molten thermoplastic resin in the form of a film and infiltrating it into a mat-like reinforced fiber layer.

A method of producing a prepreg, that is, impregnating the reinforced fibers with the thermoplastic resin and molding it into a plate-like form to obtain a molding material generally includes the step of applying pressure to promote impregnation while the thermoplastic resin is heated at a temperature not lower than the softening temperature by a hot press or double belt press method and the step of taking out the molding material by reducing the temperature to a value lower than the softening temperature while pressure is applied.

To control the number of single fibers and the distance between fibers in the reinforced fiber bundle, in the above preferred method of producing an isotropic material, they can be controlled by adjusting the size of the fiber bundle to be supplied to the cutting step, for example, the width of the fiber bundle and the number of fibers per width. Stated more specifically, the fiber bundle is supplied to the cutting step after the width of the fiber bundle is increased by opening, or the slitting step is carried out before the cutting step. The fiber bundle may be slit and cut at the same time. Alternatively, a suitable sizing agent is selected according to the opening conditions.

In the isotropic molding material obtained by using the above isotropic material, the reinforced fibers are not oriented in a specific direction within the plane and are dispersed in random directions. That is, this isotropic molding material is an in-plane isotropic material. The isotropy of the isotropic molding material can be quantitatively evaluated by obtaining the ratio of tensile elastic moduli in two directions orthogonal to each other.

(Method of Molding Isotropic Molding Material)

The fiber-reinforced resin molding can be obtained by molding the isotropic molding material in the present invention. The isotropic molding material can be advantageously used in a part which requires mechanical strength as it has excellent mechanical strength.

In the present application, to mold the isotropic molding material, compression molding such as injection molding or press molding is used. The isotropic molding material is heated right before molding to be plasticized and introduced into the mold. For heating, a hot air drier or infrared heater is used.

When the thermoplastic resin in use has water absorbency, it is preferably dried in advance. The heating temperature of the thermoplastic resin is preferably (melting temperature+15° C.) to (decomposition temperature−30° C.). When the heating temperature falls below the above range, the thermoplastic resin is not molten and therefore is hardly molded. When the heating temperature exceeds the above range, the decomposition of the thermoplastic resin may proceed.

In the present invention, the method of preforming and press-molding the isotropic material is preferred as it is excellent in productivity and isotropy. Stated more specifically, after the above isotropic molding material is heated at a plasticizing temperature which is (softening temperature of thermoplastic resin+30° C.) to (decomposition temperature of thermoplastic resin) to be softened, the isotropic molding material is placed in a mold for compression molding including an upper mold and a lower mold which are adjusted to a temperature not higher than the melting point or glass transition temperature of the thermoplastic resin, that is, between the upper mold and the lower mold, and pressure is applied between the upper mold and the lower mold to pressurize the above isotropic molding material. Since the excessive formation of creases can be suppressed by using the molding method of the present invention, it is possible to obtain a molding having irregularities with a uniform large thickness at a low pressure. At this point, as the pressure condition, a pressure of 0.1 to 20 MPa, preferably 0.2 to 15 MPa, more preferably 0.5 to 10 MPa is desirably applied. When the pressure is lower than 0.1 MPa, the isotropic material cannot be fully pushed, spring-back occurs, and the strength of the material may lower. When the pressure is higher than 20 MPa, for example, if the isotropic material is large, an extremely large press apparatus is required, which is economically not preferred. As the heating condition during pressurization, depending on the type of the thermoplastic resin, the inside temperature of the mold is preferably (crystal melting temperature−20° C.) or lower in the case of a crystalline thermoplastic resin and (glass transition temperature−20° C.) or lower in the case of an amorphous thermoplastic resin since the molten thermoplastic resin is cooled and solidified to form a fiber-reinforced resin molding. In the case of polyamide resin, it is generally 120 to 180° C., preferably 125 to 170° C., more preferably 130 to 160° C.

In the present invention, besides the isotropic material, a unidirectional fiber-reinforced molding material which is oriented in one direction or an isotropic fiber-reinforced molding material which is prepared from discontinuous fibers by a paper-making process may be used, heated, pressurized and integrated at the time of compression molding.

EXAMPLES

The following examples are provided for the purpose of further illustrating the present invention but are in no way to be taken as limiting. Equipment used for the manufacture of a press molding in the examples are as follows. Parameter values at the time of preforming and press molding were obtained by the following methods, and the present invention will be described in more detail in accordance with examples which were carried out based on items shown in FIGS. 1 to 10 and Tables 1 to 5 below.

(Mold and Shape of Molding)

An attempt was made to obtain a molding having three faces which are one bottom face and two elevation faces and a thickness of 2.5 mm by using the lower mold of a mold having a shape shown in FIG. 1 and an upper mold having a shape corresponding to the shape of the lower mold. As for the size of a press molding after press molding, the press molding had a 300 mm$^2$ square bottom face and walls having height of 100 mm which will become elevation faces. This mold incorporated a pipe containing pressurized water as a heat medium and had a temperature of 150° C.

(Compression Molding Machine)

In this application, an electric servo press manufactured by Hoden Seimitsu Kako Kenkyusho Co., Ltd. was used for evaluation. Compression molding conditions were the same and included a pressure of 15 MPa, a mold temperature of 150° C. and a molding material heating temperature of 290° C.

Molding Material

[Production Example 1] Production of Isotropic Molding Material by Using Isotropic Material The "TENAX" (registered trademark) STS40-24KS carbon fibers (average fiber diameter of 7 μm) of Toho Tenax Co., Ltd. which were treated with a nylon-based sizing agent were used as carbon fibers. A reinforced fiber mat having a carbon fiber weight of 1,800 g/m$^2$ was produced according to a method described in WO2012/105080. A mixture of the carbon fibers which had been cut and nylon 6 resin which is a crystalline thermoplastic resin (A1030 (trade name) nylon 6 resin of UNITIKA Ltd. (melting point: 225° C.)) was deposited in a belt-like form. An isotropic material containing the mixture of reinforced fibers and a thermoplastic resin on a support medium was obtained. This obtained isotropic material was injected into a plate-like mold set to 250° C. and pressurized at 2 MPa for 10 minutes, the temperature of the mold was reduced to 100° C., and then the isotropic substrate was taken out from the mold and used as a molding material in the following examples and comparative examples. The molding material obtained at this point had a thickness of 2.6 mm. In addition, molding materials were manufactured in the same manner as above except that carbon fibers having weight average carbon fiber lengths of 20 mm, 10 mm and 1 mm were used. The carbon fiber weight and the supply rate of the nylon 6 resin were adjusted to produce a molding material having a thickness of 3.6 mm by the same operation as above.

(Carriers)

In the carriers 3 and 4 used in the present invention, grippers for holding the molding material and preforming devices for pushing the molding material into the mold are arranged as shown in FIG. 5 and FIG. 6. In the following examples, a press molding material was molded by using a carrier A provided with two grippers having a gripping part, a carrier B provided with three grippers having a gripping part and a carrier C provided with three preforming devices having a pusher and two grippers having a gripping part. These carriers A to C are connected to a plane frame-like hand body 11. The carriers A to C are arranged on the frame in such a manner that they can move in a 2-dimensional direction along the surface of the frame. The hand body 11 is connected to a carrier robot 9 through an arm 10. As a result, the grippers and the pushers can move in a direction approaching or a direction departing from the hand body 11. That is, the above grippers and the above pushers can move in a direction approaching or a direction departing from a flat surface or a curved surface including the hand body. The grippers and the pushers can also move in a direction along with the hand body. When the arm 10 provided in the carrier robot 9 is driven in a vertical direction, crosswise direction and front-back direction, the hand body 11 can move freely in a vertical direction, crosswise direction and front-back direction within an area that the arm can reach and can be inclined at any angle at the same time. Further, the molding material held by the grippers can move freely in a vertical direction, crosswise direction and front-back direction and can be inclined at any angle likewise.

To obtain the press molding shown in FIG. 2, the molding material cut into a shape shown in FIG. 3 and the hand body having the carriers A to C were used. Seven grippers (to be referred to as G1 to G7, or grippers 1 to 6 hereinafter) and three pushers (to be referred to as P1 to P3, or pushers 1 to 3 hereinafter) are arranged on this hand body at predetermined positions. G1 and G2 are arranged on the carrier A, G3, G4 and G7 are arranged on the carrier B, and G5, G6, P1, P2 and P3 are arranged on the carrier C. The gripping parts having these grippers and the preforming devices having these pushers are arranged on the carriers, and the carriers are each provided with an air cylinder for moving the carriers in a direction vertical to a frame-like plane formed by the hand body. The hand body is provided with a rail and an air cylinder installed along the frame-like plane formed by the hand body. As a result, the grippers and the preforming devices can move independently in a horizontal direction or a vertical direction with respect to the plane of the flat molding material held after heating regardless of whether they are arranged on the same carrier or not.

(Gripping Part, Gripper)

In examples and comparative examples, a circular arc needle was used as the gripper. Details of this will be described hereinafter. The gripping part arranged on the carrier is connected to the carrier provided with an air cylinder or rail for moving the gripping part in a vertical direction, crosswise direction and front-back direction together with the circular arc needle arranged in the gripping part. As means of driving the gripper and the circular arc needle, the air cylinder is preferred as it is lightweight and has a simple structure. Drive means such as a servo motor drive ball screw and a linear guide are preferred as they control movement precisely.

An example of the gripping part 5 is shown in FIG. 5. In the gripping part shown in FIG. 5, a circular arc needle which is a gripper is shown in the lower part of the drawing and connected to the gripping part 5 incorporating a gear box. This circular arc needle can turn to draw a circular arc with the connection point with the gear box as the center. In FIG. 5, when the circular arc needle turns clockwise, it is stuck into the molding material so that it can grip, support and carry the molding material. When the circular arc needle turns counterclockwise, it can be removed from the molding material so that the molding material can be released from the gripper.

In the examples and comparative examples of the present invention, all the gripping parts are moved in a predetermined direction by using the air cylinder.

(Circular Arc Needle)

Figure 9:
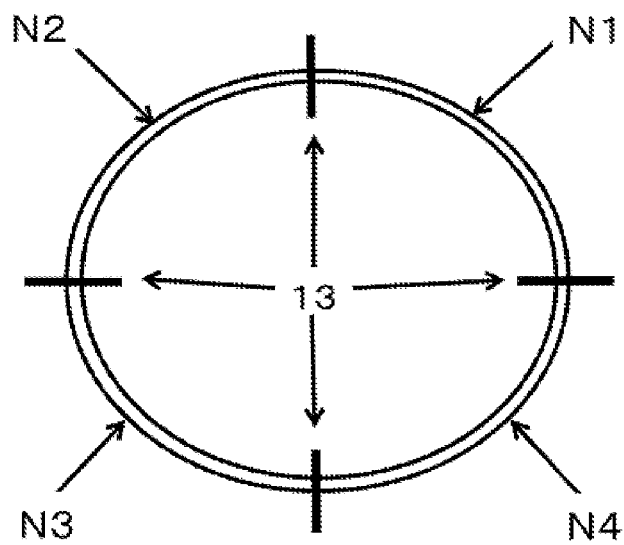
FIG. 9 shows examples of a circular wire material suitable for the manufacture of the circular arc needle of the present invention and cutting positions thereof.
Figure 10:
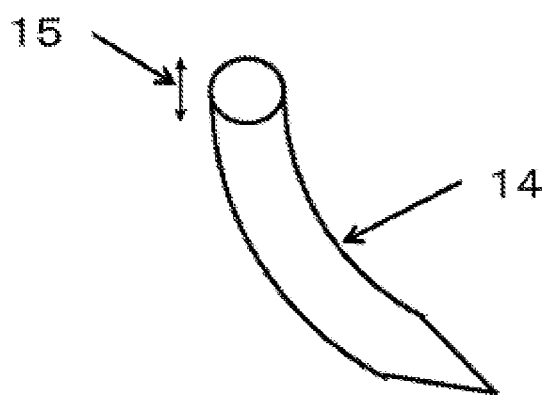
FIG. 10 shows an example of a circular arc needle used in the method of manufacturing a press molding according to the present invention.

The circular arc needle used in the examples was produced by dividing a circular spring steel wire material (SUP10) having a line diameter of 2 mm and a diameter of 40 mm shown in FIG. 9 into 4 parts and polishing one tip of each part into a needle-like form. Four bold lines 13 in FIG. 9 show cutting positions at which the above wire material was divided into 4 parts. Thereafter, the obtained circular arc wire part was processed to obtain a circular arc needle 14 shown in FIG. 10. This circular arc needle 14 was connected to the gripping part to carry out the following examples and comparative examples. The thickness of the circular arc needle 14 is the length of the needle in a direction vertical to a plane representing the entire shape of the needle extending in a circular arc, that is, the diameter 15 of the wire material before it is divided into four parts.

(Preforming Device, Pusher)

In the examples, P1 which is a pusher is made of PTFE and semi-spherical with a diameter of 40 mm. P1 was driven by using the air cylinder to push the molding material against the lower mold from above to carry out preforming. P2 and P3 both of which are pushers are made of PTFE and shaped like a cylindrical rod having a length of 150 mm and a diameter of 30 mm. P2 and P3 were driven by using the air cylinder to push the molding material against the lower mold from above to carry out preforming. In the examples and comparative examples, PTFE pushers (heat conductivity: 0.23 W/m·K) were used. In Example 10, aluminum pushers (heat conductivity: 236 W/m·K) were used. The heat conductivity of the molding material was 0.38 W/m·K.

(Preforming Rate)

The preforming rate is a numerical value representing a shape difference between the preformed molding (second preformed molding) and a product drawing. For example, the preforming rate is 100% when a preformed molding having the same shape as that of the product drawing is obtained. The preforming rate is 0% when the same plane is not existent at all. To calculate the actual preforming rate, the shape of a preformed molding is measured by using a stereo camera type 3D shape measuring instrument (3D-Camera type shape measuring instrument:ATOSIII Triple Scan (trade name of the measuring instrument) of GOM mbh). The measurement data is converted into a 3D-CAD drawing by using 3D-CAD software (computer-aided design software) (the GOM Professional (software trade name) of GOM mbh). The shape of the CAD drawing of this preformed molding is superimposed on the shape of a CAD drawing obtained from the design drawing of a press molding by a best-fitting method to carry out best-matching operation. Stated more specifically, the area of apart away from the product face of the press molding a distance which is not less than 2 times the thickness of the molding material in a normal direction is obtained to define the preforming rate by the following numerical expression (3) from the area ratio.

$$\text{Preforming rate} = (A-B)/A \times 100(\%) \quad (3)$$

A: surface area of a second preformed molding after preforming (second preformed molding)
B: area of a part which is away from the product face of a press molding a distance which is not less than 2 times the thickness of the molding material in a normal direction The term "best fit" means a treatment for superimposing a design shape on actual measurement values as a pretreatment for the evaluation of a planar or curved surface shape. The best-matching operation by the best-fitting method refers to the operation of obtaining the amount of a deviation from 3D data on the shape of a press molding prepared in the design stage of a press molding and 3D data obtained by measuring the obtained second preformed molding and superimposing the design data to obtain a coordinate system in which the sum of squares of the deviation amount become minimum.

(Surface Treatment of Needle)

Varnish containing PTFE was applied to the entire surface of the circular arc needle and cured to carry out PTFE coating.

(Surface Coating of Needle)

An emulsion release agent was prepared by diluting the KM-722T (trade name) silicone-based release agent of Sin-Etsu Chemical Co., Ltd. 10 times. Before the step 21 of lifting the heated molding material with the circular arc needle, the circular arc needle was brought into contact with a bath filled with the release agent diluent to adhere the release agent diluent to the surface of the needle.

(Operations of Gripper and Preforming Device)

The grippers and the pushers can move in a horizontal direction and a vertical direction with respect to the surface of the molding material lifted by the carrier. At this point, the preformed shape greatly differs according to the moving timings and moving distances of the grippers and the pushers. That is, the preforming rate of the present invention changes according to the operation specifications and the positions of these. The operation examples in the examples of the present invention are shown in Tables land 2. The positions of rectangles and ellipses in FIG. 4 show the contact positions of the grippers and the pushers at the time of carrying and preforming the molding material in the first preformed molding and the press molding after preforming.

These preforming operations can be divided into two steps or three steps or more.

The linear distance between grippers was measured by the following method. One tip of a yarn having both marked tips was fixed to one gripper and the other tip of the yarn was brought into contact with the other gripper while tension was applied. In this state, both grippers were operated, and the relationship between the grippers and the yarn during operation was recorded with a high-speed video camera to measure the distance between the grippers from the relationship between the marks of the yarn and the grippers during operation on a real-time basis. As examples of the measured distance between the grippers, values of the distance between G4 and G6 measured by this method before and after preforming are shown in Tables 3 to 5. As the stop position of G4, the most suitable stop position in the cavity of the mold is determined as 0 mm, and when the operation distance of the gripper G4 is longer than this, a plus value is given and when the operation distance is shorter than this, a minus value is given in Tables 3 to 5 in the unit of mm.

Operation Examples

In the present invention, as the operation examples of preforming after the molding material was moved onto the lower mold by the carrier, five different operation examples for driving the grippers and the pushers as follows were carried out.

1) Operation Example 1

Step 1; After the gripper G1 is moved in a horizontal direction while the pushers P2 and P3 are pushed in a vertical direction, the molding material is released from the gripper. The grippers G2, G3 and G4 are moved in a horizontal direction and kept as they are, and the grippers G5 and G6 are moved in a vertical direction and kept as they are. The gripper G7 is moved in a horizontal direction and then in a vertical direction and kept as it is.

Step 2; The gripper G7 releases the molding material and the pusher P1 is pushed down in a vertical direction at the same time.

Step 3; The grippers G2 to G6 release the molding material to complete preforming.

2) Operation Example 2

As compared with the operation example 1, when G6 was pushed down in a vertical direction in step 2, the linear distance between the grippers G5 and G6 greatly changed in the step 1. As a result, the molding material was extended between G5 and G6 and cracked.

3) Operation Example 3

All the grippers and the preforming devices are operated in the step 1, the pushers are pushed down in a vertical direction, and the grippers are moved in a horizontal direction or a vertical direction. G7 is moved in a horizontal direction and a vertical direction.

In step 2, G1, G2, G3, G4, G5, G6 and G7 release the molding material. In this case, the distance between the grippers and the pushers changed and the molding material was extended between G7 and G6 and cracked.

4) Operation Example 4

As compared with the operation example 1, after the grippers G1, G3 and G7 released the molding material in the step 1, the pusher P1 was pushed down in a vertical direction to push the molding material against the lower mold in the step 2. As a result, the molding material in the vertical direction on the lower mold fell off.

5) Operation Example 5

As compared with the operation example 1, the pushers P1, P2 and P3 were pushed down in a vertical direction at the same time to push the molding material against the lower mold in the step 2. As a result, mating faces did not overlap with each other and opened.

The operations of the grippers and the pushers in the above operation examples 1 to 5 are shown in Tables 1 and 2. The grippers and the pushers perform operations described from the upper column to the lower column in Tables 1 and 2 for each step independently. In the steps marked with "○", pushing in the vertical direction, movement in the horizontal direction, releasing or movement in the vertical direction described in respective columns is performed. The empty columns indicate that the grippers and the pushers are out of operation.

TABLE 1

| Type of pusher or gripper | type of operation | operation example 1 | | | operation example 2 | | | operation example 3 | |
|---|---|---|---|---|---|---|---|---|---|
| | | Step 1 | Step 2 | Step 3 | Step 1 | Step 2 | Step 3 | Step 1 | Step 2 |
| Operation of pusher — pusher 1 | pushing in vertical direction | | ○ | | | ○ | | ○ | |
| pusher 2 | pushing in vertical direction | ○ | | | ○ | | | ○ | |
| pusher 3 | pushing in vertical direction | ○ | | | ○ | | | ○ | |
| Operation of gripper — gripper 1 | moving in horizontal direction | ○ | | | ○ | | | ○ | |
| | Releasing | ○ | | | ○ | | | | ○ |
| gripper 2 | moving in horizontal direction | ○ | | | ○ | | | ○ | |
| | Releasing | | | ○ | | | ○ | | ○ |
| gripper 3 | moving in horizontal direction | ○ | | | ○ | | | ○ | |
| | Releasing | | | ○ | | | ○ | | ○ |
| gripper 4 | moving in horizontal direction | ○ | | | ○ | | | ○ | |
| | Releasing | | | ○ | | | ○ | | ○ |
| gripper 5 | Moving in vertical direction | ○ | | | ○ | | | ○ | |
| | Releasing | | | ○ | | | ○ | | ○ |
| gripper 6 | Moving in vertical direction | ○ | | | | ○ | | ○ | |
| | Releasing | | | ○ | | | ○ | | ○ |
| gripper 7 | moving in horizontal direction | ○ | | | ○ | | | ○ | |
| | Moving in vertical direction | ○ | | | ○ | | | ○ | |
| | Releasing | | ○ | | | ○ | | | ○ |

TABLE 2

| Type of pusher or gripper | type of operation | operation example 4 | | | operation example 5 | | |
|---|---|---|---|---|---|---|---|
| | | Step 1 | Step 2 | Step 3 | Step 1 | Step 2 | Step 3 |
| Operation of pusher — pusher 1 | pushing in vertical direction | | ○ | | | ○ | |
| pusher 2 | pushing in vertical direction | ○ | | | | ○ | |
| pusher 3 | pushing in vertical direction | ○ | | | | ○ | |
| Operation of gripper — gripper 1 | moving in horizontal direction | ○ | | | ○ | | |
| | Releasing | ○ | | | ○ | | |
| gripper 2 | moving in horizontal direction | ○ | | | ○ | | |
| | Releasing | | ○ | | ○ | | ○ |
| gripper 3 | moving in horizontal direction | ○ | | | ○ | | |
| | Releasing | ○ | | | | | ○ |
| gripper 4 | moving in horizontal direction | ○ | | | ○ | | |
| | Releasing | | ○ | | | | ○ |
| gripper 5 | Moving in vertical direction | ○ | | | ○ | | |
| | Releasing | | | ○ | | | ○ |

TABLE 2-continued

| Type of pusher or gripper | type of operation | operation example 4 | | | operation example 5 | | |
|---|---|---|---|---|---|---|---|
| | | Step 1 | Step 2 | Step 3 | Step 1 | Step 2 | Step 3 |
| gripper 6 | Moving in vertical direction | ○ | | | ○ | | |
| | Releasing | | | ○ | | | ○ |
| gripper 7 | moving in horizontal direction | ○ | | | ○ | | |
| | Moving in vertical direction | ○ | | | ○ | | |
| | Releasing | ○ | | | | ○ | |

(Variation Rate)

A description is given of variation rate and measurement evaluation in the present invention. As for one or more grippers and one or more pushers arranged on the carriers as described, the distance between one gripper or pusher and another gripper or pusher is measured on real-time basis from the time when the molding material is lifted by the grippers to the time when preforming is carried out. That is, the real-time distances of the number of combinations of one gripper or pusher and another gripper or pusher are measured. In this case, the "distance" is not the shortest distance between points but the "distance" from the gripper or the "distance" to the gripper means the length of a connection line having the shortest distance along the surface of the molding material. When a straight line is connected along the surface of the substrate, if the line protrudes from the periphery of the molding material, the variation rate is not measured. The variation rate is calculated from a value before preforming and a value after preforming based on the following numerical expression (1). In the present invention, this variation rate is preferably −10 to 10%.

$$\text{Variation rate}=(C-D)/D\times 100(\%) \quad (1)$$

C: shortest distance from the position of one circular arc needle or the contact position between the pusher and the molding material to the position of another circular arc needle or the contact position between the pusher and the molding material along the surface of the molding material after preforming D: shortest distance from the position of one circular arc needle or the contact position between the pusher and the molding material to the position of another circular arc needle or the contact position between the pusher and the molding material along the surface of the molding material before preforming The position of the gripper at the time of measuring the "distance" is the position of the circular arc needle, more specifically, the position of the needle stuck into the molding material. The center of the shape of the preforming device is the center of gravity of the shape of a part in contact with the molding material of the pusher. By setting this variation rate to the above numerical range, the elongation and slack of the molding material which does not contribute to preforming are prevented while the molding material is formed into the first preformed molding before and after preforming, thereby making it possible to obtain a first preformed molding having no crease, no fall-off of the substrate from the elevation faces and a desired thickness.

In examples and comparative examples, the physical properties and evaluation of the molding material, the second preformed molding and the press molding were carried out by the following operations.

(a) Average Carbon Fiber Length

The average fiber length of carbon fibers can be obtained based on the following numerical expressions (4) and (5) by measuring the fiber lengths of 100 fibers extracted at random from the molding material, the preformed molding and the press molding to a unit of 1 mm with a caliper. The extraction of the reinforced fibers from the isotropic molding material can be carried out, for example, by heating the isotropic molding material at 500° C. for about 1 hour to remove the thermoplastic resin in the furnace.

$$\text{Number average fiber length: } Ln=\Sigma Li/j \quad (4)$$

(Li: fiber length of single fiber of reinforced fibers, j: number of reinforced fibers)

$$\text{Weight average fiber length: } Lw=(\Sigma Li^2)/(\Sigma Li) \quad (5)$$

When the fiber length is a fixed length, for example, by cutting the carbon fibers with a rotary cutter, the number average fiber length and the weight average fiber length become extremely close to each other.

(b) Carbon Fiber Volume Ratio

A rectangular sheet measuring 100 mm×100 mm was cut out from the molding material to measure its weight w0 (g). The obtained rectangular sheet-like molding material was heated in air at 500° C. for 1 hour to burn off the thermoplastic resin component constituting the molding material so as to measure the weight w1 (g) of the remaining carbon fibers. The weight ratio Wf of the carbon fibers was obtained from the measurement results based on the following numerical expression (6). Three rectangular sheet-like molding materials were sampled from the same molding material to measure their weight ratios in the same manner as described above so as to obtain an average value.

Weight Ratio of Carbon Fibers:

$$Wf=(\text{weight of carbon fibers: } w1)/(\text{weight of molding material: } w0)\times 100 \quad (6)$$

The carbon fiber volume ratio Vf was calculated from the specific gravity of each component based on the following numerical expression (7). In general, the following mathematic formula (7) is established between the carbon fiber volume ratio Vf and the carbon fiber weight ratio Wf.

$$1/Vf=1+\rho f/\rho m(1/Wf-1) \quad (7)$$

(c) Thicknesses of Substrates of Molding Material, Preformed Molding and Press Molding The thicknesses of the substrates of the molding material, the preformed molding and the press molding were measured at 10 points arbitrarily selected to a unit of 0.1 mm with a caliper to obtain average values.

(d) Length of Gripping Part for Molding Material and Thickness of Hook Needle

As for the length of the gripping part for the molding material, a mark formed on the molding material by the gripper was measured as a straight-line distance to a unit of 0.1 mm with a caliper. When the distance of the straight line is regarded as less than 0.1 mm, it is judged that the molding material is held at a point. As for the thickness of the circular arc needle, the length of the needle in a direction vertical to a plane (for example, circular arc, elliptical arc) representing the entire shape of the needle characteristically was measured to a unit of 0.1 mm with a caliper.

(e) Overlapping Rate

When parts of one or more molding materials were overlapped with each other to preform elevation faces at the time of preforming the molding material, the maximum length of an overlapped part represented by the following numerical expression (2) was measured to a unit of 0.1 mm with a caliper. When the thickness varied, a number average value of the lengths at arbitrarily selected 10 points was adopted as described above.

$$\text{Overlapping rate (\%)} = \text{maximum length of overlapped part}/\text{thickness of molding material} \times 100 \quad (2)$$

Since a press molding was manufactured from the molding material having a shape shown in FIG. 3 in examples and comparative examples, the length of a part shown by arrows in both directions in FIG. 3 was adopted as the maximum length of the overlapped part. In FIG. 3, the broken line shows a boundary line between the overlapped part and a part which will become the product face of the press molding.

(f) Softening Temperature

The softening temperature of the thermoplastic resin is defined as crystal melting temperature, that is, melting point Tm when the thermoplastic resin is a crystalline resin and as glass transition temperature Tg when the thermoplastic resin is an amorphous resin. Tm and Tg were obtained by measuring the thermoplastic resin with a scanning thermal analyzer at a temperature elevation rate of 10° C./min.

(g) Approximate Curvature Radius and Thickness of Needle of Gripping Part

When the shape of the needle of the gripper was circular arc, the radius of the corresponding circular arc was calculated as approximate curvature radius. When the shape of the needle was elliptical arc, the average value of the radius of the long-diameter circle and the radius of the short-diameter circle of the ellipse was calculated as approximate curvature radius. As for the thickness of the needle, the length of the needle in a direction vertical to a plane (for example, circular arc, elliptical arc) representing the shape of the needle was measured with a micrometer.

(h) Variation Rate

The distance from one gripper or pusher to another gripper or pusher along the surface of the substrate was measured on real-time basis before and after preforming to calculate a variation rate from the following numerical expression (1). In the present invention, this variation rate is preferably −10 to 10%.

$$\text{Variation rate} = (C-D)/D \times 100 (\%) \quad (1)$$

C: shortest distance from the position of one circular arc needle or the contact position between the pusher and the molding material to the position of another circular arc needle or the contact position between the pusher and the molding material along the surface of the molding material after preforming D: shortest distance from the position of one circular arc needle or the contact position between the pusher and the molding material to the position of another circular arc needle or the contact position between the pusher and the molding material along the surface of the molding material before preforming (i) Evaluation of First Preformed Molding, Press Molding and Deposit on Needle of Gripper As for the evaluation of the preformed molding, a preformed molding having no crease, no fall-off of the substrate and no opening phenomenon of the mating face visually after the end of preforming was judged as acceptable. A preformed molding having a crease, fall-off of the substrate and an opening phenomenon of the mating face visually after the end of preforming was judged as unacceptable, and a molding material which could not be preformed was judged as molding impossible.

The appearance of a press molding was evaluated based on the existence of a crease in the appearance of the molding, the existence of projection into the mold chassis edge of the substrate from the elevation faces, the existence of fall-off of the substrate from the elevation faces and the existence of the opening of the mating face. These phenomena are referred to as "existence of crease on surface", "projection from elevation faces", "fall-off of substrate from elevation faces" and "opening of mating face" in Tables 3 to 5, respectively. The existence of a deposit on the needle of the gripper was checked visually.

(j) Heat Conductivity

The heat conductivities of materials such as the molding material and the pushers were measured by a heat-ray method for directly measuring heat conductivity from the amount of heat generated from a hot wire (heater wire) and a temperature rise.

Example 1

A substrate which will become an isotropic molding material obtained by using carbon fibers having a weight average carbon fiber length of 20 mm and nylon 6 resin in Production Example 1 and having a carbon fiber volume ratio Vf of 30 vol % and a press molding equivalent thickness of 2.5 mm (thickness of molding material: 2.6 mm) was used. This substrate was cut into a shape whose outer frame is shown by a bold line in FIG. 3 and heated with far infrared heaters to ensure that the surface temperature of the molding material became 290° C. The heating time at this point was 420 seconds. As for the heating method, the substrate was placed on a metal lattice, heated with far infrared heaters set on the both sides of the metal lattice and taken out together with the metal lattice after the passage of a predetermined time. Then, a carrier having a gripping part with grippers was placed above the heated substrate on the metal lattice which had been taken out, and the gripping part 5 was lowered to a position about 10 mm above the substrate. Subsequently, the circular arc needle at the tip of the gripper was turned from the position 6a to the position 6b to be stuck into the substrate, and the carrier was moved up to lift and hold the heated substrate. The circular arc needle used at this point was circular arc with a center angle of 90°, a radius of 20 mm and a circular cross-section with a diameter of 2 mm and produced by dividing a circular wire material having a diameter of 40 mm into four parts as shown in FIG. 9 and machining one tip (see FIG. 10). The circular arc surface was coated with PTFE. When a molding material having a thickness of 2.5 mm was lifted by the above circular arc needle, the distance of the molding material held by the circular arc needle (length of the gripping part) was 3.5 mm.

After the carrier lifting the substrate was carried between the upper mold and the lower mold of a mold for compression molding to a position 30 mm above the surface of the mold for compression molding, the grippers and the pushers were driven according to the operation example 1 in Table 1 to preform the molding material. At this point, the pusher P1 was situated between the grippers G6 and G7, the pusher P2 was situated between the grippers G2 and G5, and the pusher P3 was situated between the grippers G4 and G5. As a result, a first preformed molding having elevation faces and an overlapped part was molded on the lower mold. At this point, the shortest distance between G4 and G6 along the surface of the molding material was 285 mm before preforming and 287 mm after preforming which is close to the former value. In each step of the operation example 1, the moving speeds of the grippers and the pushers and the flow rate of air supplied into the air cylinder were adjusted to keep the constant distance. As a result, the variation rate between G4 and G6 in the steps 1, 2 and 3 was 0 to 3%.

The second preformed molding after cooling and solidification was taken out from the mold to measure its shape and calculate the preforming rate by the above method. Then, the first preformed molding which had been preformed separately was compression molded immediately by closing the mold for compression molding and applying pressure to obtain a press molding having elevation faces. At this point, the temperature of the mold for compress molding was adjusted to 150° C., and a pressure of 20 MPa in terms of a projection area in the mold closing and opening direction was applied to the press molding to carry out forming. Pressurization was kept for 35 seconds, and the press molding was taken out by opening the mold when the temperature of the press molding became 180° C. This series of molding operations was repeated 10 times to confirm that a series of press molding operations could be carried out stably.

As a result of the above operations, the preformed molding had a preforming rate of 90%. The overlapping rate of the corner overlapped part between the elevation faces and the bottom face was 800%. At this point, the lifting of the heated substrate was satisfactory, and when the adhesion of the resin to the needle after 10 times of continuous operation was checked, no deposit was seen. The obtained press molding was free from projection into the chassis edge of the mold from the elevation faces, a short circuit caused by the fall-off of the substrate from the elevation faces and the opening of the mating face. Thus, a satisfactory press molding was obtained.

Example 2

In place of the molding material having a weight average carbon fiber length of 20 mm and a carbon fiber volume ratio Vf of 30 vol % in Example 1, an isotropic molding material produced by using carbon fibers having a weight average fiber length of 10 mm and nylon 6 resin in Production Example 1 and having a carbon fiber volume ratio Vf of 40 vol % and a press molding equivalent thickness of 2.5 mm (thickness of molding material of 2.6 mm) was used. Preforming and compression molding were carried out under the same conditions as in Example 1 except that this molding material was used to produce a press molding. Molding was repeated 10 times. As a result, a satisfactory press molding could be obtained stably as in Example 1.

Example 3

In place of the molding material having a weight average carbon fiber length of 20 mm and a carbon fiber volume ratio Vf of 30 vol % in Example 1, an isotropic molding material produced by using carbon fibers having a weight average carbon fiber length of 20 mm and nylon 6 resin in Production Example 1 and having a carbon fiber volume ratio Vf of 30 vol % and a press molding equivalent thickness of 3.5 mm (thickness of molding material of 3.6 mm) was used. Preforming and compression molding were carried out under the same conditions as in Example 1 except that this molding material was used to produce a press molding. Molding was repeated 10 times. As a result, a satisfactory press molding could be obtained stably as in Example 1.

Example 4

In place of the circular arc needle having a circular cross-section diameter of 2 mm in Example 1, a circular arc needle having a rectangular cross-section with a thickness of 2 mm and a width of 3 mm was used. When this needle was used, the thickness of the circular arc needle was 2 mm. Preforming and compression molding were carried out under the same conditions as in Example 1 except for this to produce a press molding. Molding was repeated 10 times. The distance for holding the molding material with this circular arc needle (length of gripping part) was 3.5 mm which was the same as in Example 1. As a result, a satisfactory press molding could be obtained stably as in Example 1.

Example 5

In place of the circular arc needle having a circular cross-section diameter of 2 mm in Example 1, a circular arc needle having a circular cross-section with a diameter of 1.5 mm was used. Preforming and compression molding were carried out under the same conditions as in Example 1 except for this to produce a press molding. Molding was repeated 10 times. The distance for holding the molding material with this circular arc needle (length of gripping part) was 3.5 mm which was the same as in Example 1. As a result, a satisfactory press molding could be obtained stably as in Example 1.

Example 6

A substrate which will become a molding material was cut to ensure that only the overlapping rate became 400% in Example 1. Stated more specifically, the substrate was cut to ensure that an area to be overlapped of the molding material at the time of molding, that is, the area of a trapezoidal part around the area held by the grippers G3 and G7 in FIG. 3 became smaller than that of the molding material used in Example 1. Preforming and compression molding were carried out under the same conditions as in Example 1 except for this to produce a press molding. Molding was repeated 10 times. As a result, a satisfactory press molding could be obtained stably as in Example 1 at a preforming rate of 90%.

Example 7

The surface of the circular arc needle was brought into contact with ordinary water without being coated with PTFE before the heated molding material was stuck with the needle. Preforming and compression molding were carried out under the same conditions as in Example 1 except for this to produce a press molding. As a result, even after molding was carried out continuously 10 times, the adhesion of the thermoplastic resin constituting the molding material to the surface of the circular arc needle was not seen.

Example 8

The surface of the circular arc needle was brought into contact with an aqueous diluent of a silicone emulsion-based release agent without being coated with PTFE before the heated molding material was stuck with the needle. Preforming and compression molding were carried out under the same conditions as in Example 1 except for this to produce a press molding. As a result, even after molding was carried out continuously 10 times, the adhesion of the thermoplastic resin constituting the molding material to the surface of the circular arc needle was not seen.

Example 9

Preforming and compression molding were carried out continuously 10 times under the same conditions as in Example 1 while the surface of the circular arc needle was not coated with PTFE. As a result, molding could be carried out four times but after the 4-th time, the molding material adhered to the surface of the needle at the time of releasing the circular arc needle after preforming and a phenomenon that the first preformed molding greatly shifted occurred. The evaluation results of a press molding obtained by the first molding operation are given.

Example 10

In place of the preforming device having PTFE pushers in Example 1, a preforming device having aluminum pushers was used. Preforming and compression molding were carried out under the same conditions as in Example 1 except for this to produce a press molding. As a result, marks formed by pushing the tips of the pushers remained on parts in contact with the pushers of the first preformed molding after preforming. However, the push marks remained slightly in the subsequent compression molding but did not greatly impair the appearance of the press molding.

Comparative Example 1

In place of the molding material having a weight average carbon fiber length of 20 mm and a carbon fiber volume ratio Vf of 30 vol % in Example 1, a molding material produced by using carbon fibers having a weight average carbon fiber length of 1 mm and nylon 6 resin in Production Example 1 and having a carbon fiber volume ratio Vf of 30 vol % and a press molding equivalent thickness of 2.5 mm (thickness of molding material of 2.6 mm) was used to be molded. Preforming and compression molding were carried out under the same conditions as in Example 1 except for this to try to produce a press molding. When the molding material was stuck with the circular arc needle and lifted, the molding material was broken and dropped, and therefore it was difficult to carry the molding material. As a result, a press molding could not be produced.

Comparative Example 2

Instead of carrying out the operations of the grippers and the pushers based on the operation example 1 in Table 1 in Example 1, the operation example 2 was carried out to perform preforming and then try compression molding. The distance between G5 and G6 became 308 mm temporarily in the step 1 of the operation example 2 and the variation rate exceeded 10%. After that, the distance between G5 and G6 became 287 mm in the step 2 and the variation rate dropped. However, the substrate was broken between G5 and G6 in the step 1, and a crease was produced on the surface of the first preformed molding, resulting in a molding failure. The preforming rate at this point was 74%.

Comparative Example 3

Instead of carrying out the operations of the grippers and the pushers based on the operation example 1 in Table 1 in Example 1, the operation example 3 was carried out to perform preforming and then try compression molding. The distance between G6 and G7 was 83 mm before preforming but became 96 mm temporarily during operation in the step 1. In the step 1, the variation rate exceeded 10%. As a result, the substrate was broken between G6 and G7, and a crease was produced on the surface of the first preformed molding. The preforming rate at this point was 68%.

Comparative Example 4

Instead of carrying out the operations of the grippers and the pushers based on the operation example 1 in Table 1 in Example 1, the operation example 4 shown in Table 2 was carried out to perform preforming and then try compression molding. As a result, the substrate near an elevation face mating part fell off, whereby a first preformed molding having a normal shape could not be obtained. The preforming rate at this point was 34%.

Comparative Example 5

Instead of carrying out the operations of the grippers and the pushers based on the operation example 1 in Table 1 in Example 1, the operation example 5 shown in Table 2 was carried out to perform preforming and then try compression molding. As a result, the elevation face mating part was not mated properly and a first preformed molding having an opened mating face was obtained. The preforming rate at this point was 71%.

Comparative Example 6

In Example 1, the moving distance in the horizontal direction of G4 was made 15 mm shorter and the moving distances in the vertical direction of G6 and G5 were adjusted to prevent the change of the distance between G4 and G6 before and after preforming. Other conditions were the same as in Example 1. The preforming rate of the obtained first preformed molding was 75%. However, when compression molding was carried out in the same manner as in Example 1, since clamping was made while the molding material projected outward from the elevation faces of the mold, the molding material was bitten by the chassis edge of the mold with the result that sufficiently high molding pressure was not applied to a product part. Therefore, a crease mark remained, thereby deteriorating the appearance of the press molding.

Comparative Example 7

This is an experimental example of a press molding which was obtained by using a commercially available needle gripper in place of the circular arc needle.

The SNG-Y-12-2.0-V (trade name) of SCHMALZ was set on the carrier to carry out the same operation as in Example 1. This needle gripper had 12 linear needles which were arranged to cross one another, and the molding material holding length of the gripper was about 110 m. In this case, even when the molding material was pushed by the pushers, the molding material was pulled and torn off without following the movement of the pushers. Thus, preforming was difficult.

The molding conditions and the evaluation results of the preformed moldings and the press moldings of Examples 1 to 10 and Comparative Examples 1 to 7 are shown in Tables 3 to 5.

TABLE 3

| | | Example 1 | Example 2 | Example 3 | Example 4 | Example 5 |
|---|---|---|---|---|---|---|
| Molding material | carbon fiber length | 20 mm | 10 mm | 20 mm | 20 mm | 20 mm |
| | Carbon fiber volume ratio | 30% | 40% | 30% | 30% | 30% |
| | thickness | 2.6 mm | 2.6 mm | 3.6 mm | 2.6 mm | 2.6 mm |
| Needle | cross-sectional shape | circular | circular | circular | rectangular | circular |
| | Thickness | 2 mm | 2 mm | 2 mm | 2 mm | 1.5 mm |
| | Surface treatment | PTFE | PTFE | PTFE | PTFE | PTFE |
| Material of pushers of preforming device | | PTFE | PTFE | PTFE | PTFE | PTFE |
| Preforming rate(%) | | 90% | 90% | 90% | 90% | 90% |
| Overlapping rate(%) | | 800% | 800% | 800% | 800% | 800% |
| Operation pattern | | operation example 1 | operation example 1 | operation example 1 | operation example 1 | operation example 1 |
| Distance between G4 and G6 (mm) | before preforming | 285 mm | 285 mm | 285 mm | 285 mm | 285 mm |
| | After preforming | 287 mm | 287 mm | 287 mm | 287 mm | 287 mm |
| Stop position of G4 | | 0 mm | 0 mm | 0 mm | 0 mm | 0 mm |
| Variation rate | | 0 to 3% | 0 to 3% | 0 to 3% | 0 to 3% | 0 to 3% |
| Pick-up of molding material | | Good | Good | Good | Good | Good |
| Existence of deposit on needle | | none | none | none | none | none |
| Evaluation of preformed molding | | acceptable | acceptable | acceptable | acceptable | acceptable |
| Evaluation of press molding | existence of crease on surface | none | none | none | none | none |
| | Projection from elevation faces | none | none | none | none | none |
| | Fall-off of substrate from elevation faces | none | none | none | none | none |
| | Opening of mating face | none | none | none | none | none |

PTFE: polytetrafluoroethylene

TABLE 4

| | | Example 6 | Example 7 | Example 8 | Example 9 | Example 10 |
|---|---|---|---|---|---|---|
| Molding material | carbon fiber length | 20 mm | 10 mm | 20 mm | 20 mm | 20 mm |
| | Carbon fiber volume ratio | 30% | 30% | 30% | 30% | 30% |
| | thickness | 2.6 mm | 2.6 mm | 3.6 mm | 2.6 mm | 2.6 mm |
| Needle | cross-sectional shape | circular | circular | circular | circular | circular |
| | Thickness | 2 mm | 2 mm | 2 mm | 2 mm | 1.5 mm |
| | Surface treatment | PTFE | water | release agent | None | PTFE |
| Material of pushers of preforming device | | PTFE | PTFE | PTFE | PTFE | aluminum |
| Preforming rate(%) | | 90% | 90% | 90% | 90% | 90% |
| Overlapping rate(%) | | 400% | 800% | 800% | 800% | 800% |
| Operation pattern | | operation example 1 | operation example 1 | operation example 1 | operation example 1 | operation example 1 |
| Distance between G4 and G6 (mm) | before preforming | 285 mm | 285 mm | 285 mm | 285 mm | 285 mm |
| | After preforming | 287 mm | 287 mm | 287 mm | 287 mm | 287 mm |
| Stop position of G4 | | 0 mm | 0 mm | 0 mm | 0 mm | 0 mm |
| Variation rate | | 0 to 3% | 0 to 3% | 0 to 3% | 0 to 3% | 0 to 3% |
| Pick-up of molding material | | Good | Good | Good | Good | Good |
| Existence of deposit on needle | | none | none | none | existent | none |
| Evaluation of preformed molding | | acceptable | acceptable | acceptable | acceptable | acceptable |
| Evaluation of press molding | existence of crease on surface | none | none | none | none | none |
| | Projection from elevation faces | none | none | none | none | none |
| | Fall-off of substrate from elevation faces | none | none | none | none | none |
| | Opening of mating face | none | none | none | none | none |

PTFE: polytetrafluoroethylene

TABLE 5

|  |  | C. Ex. 1 | C. Ex. 2 | C. Ex. 3 | C. Ex. 4 | C. Ex. 5 |
|---|---|---|---|---|---|---|
| Molding material | carbon fiber length | 1 mm | 20 mm | 20 mm | 20 mm | 20 mm |
|  | Carbon fiber volume ratio | 30% | 30% | 30% | 30% | 30% |
|  | thickness | 2.6 mm | 2.6 mm | 2.6 mm | 2.6 mm | 2.6 mm |
| Needle | cross-sectional shape | circular | circular | circular | circular | circular |
|  | Thickness | 2 mm | 2 mm | 2 mm | 2 mm | 2 mm |
|  | Surface treatment | PTFE | PTFE | PTFE | PTFE | PTFE |
| Material of pushers of preforming device |  | PTFE | PTFE | PTFE | PTFE | aluminum |
| Preforming rate(%) |  | — | 74% | 68% | 34% | 71% |
| Overlapping rate(%) |  | — | 800% | 800% | 800% | 800% |
| Operation pattern |  | — | operation example 2 | operation example 3 | operation example 4 | operation example 5 |
| Distance between G4 and G6 (mm) | before preforming | 285 mm | 285 mm | 285 mm | 285 mm | 285 mm |
|  | After preforming | 287 mm | 287 mm | 287 mm | 287 mm | 287 mm |
|  | Stop position of G4 | 0 mm | 0 mm | 0 mm | 0 mm | 0 mm |
|  | Variation rate | Not measurable | larger than 10% | larger than 10% | Not measurable | 0 to 3% |
| Pick-up of molding material |  | difficult | Good | Good | Good | Good |
| Existence of deposit on needle |  | none | none | none | none | none |
| Evaluation of preformed molding |  | Molding impossible | unacceptable | unacceptable | unacceptable | unacceptable |
| Evaluation of press molding | existence of crease on surface | — | existent | existent | none | none |
|  | Projection from elevation faces | — | none | none | none | none |
|  | Fall-off of substrate from elevation faces | — | none | none | existent | none |
|  | Opening of mating face | — | none | none | none | existent |

|  |  | C. Ex. 6 | C. Ex. 7 |
|---|---|---|---|
| Molding material | carbon fiber length | 20 mm | 20 mm |
|  | Carbon fiber volume ratio | 30% | 30% |
|  | thickness | 2.6 mm | 2.6 mm |
| Needle | cross-sectional shape | circular | — |
|  | Thickness | 2 mm | — |
|  | Surface treatment | PTFE | PTFE |
| Material of pushers of preforming device |  | PTFE | PTFE |
| Preforming rate(%) |  | 75% | — |
| Overlapping rate(%) |  | 800% | — |
| Operation pattern |  | operation example 1 | — |
| Distance between G4 and G6 (mm) | before preforming | 285 mm | 285 mm |
|  | After preforming | 287 mm | 287 mm |
|  | Stop position of G4 | −15 mm | 0 mm |
|  | Variation rate | 0 to 3% | Not measurable |
| Pick-up of molding material |  | good | good |
| Existence of deposit on needle |  | none | none |
| Evaluation of preformed molding |  | acceptable | Molding impossible |
| Evaluation of press molding | existence of crease on surface | existent | — |
|  | Projection from elevation faces | existent | — |
|  | Fall-off of substrate from elevation faces | none | — |
|  | Opening of mating face | none | — |

C. Ex.: Comparative Example
PTFE: polytetrafluoroethylene

INDUSTRIAL FEASIBILITY

By using the method of manufacturing a press molding of the carbon fiber-reinforced resin composite material of the present invention, even when a product has a complex shape, preforming is made possible before the composite material is cooled on a mold for compression molding capable of cold pressing and a molding having a good appearance can be manufactured. In other words, a press molding free from a crease on the surface, the projection of the substrate from the elevation faces, the fall-off of the substrate from the elevation faces and the opening of the mating face can be manufactured. The provision of the press molding obtained as described above has the effect of cutting the cost of a structural part for automobiles and ensures the reduction of the weight of a car body. The reduction of the cost and weight of the structural part of an automobile has great industrial significance.

EXPLANATION OF REFERENCE SYMBOLS

1 flat face of a press molding obtained in Example
2 elevation face of the press molding obtained in Example G1 part in contact with a molding material before molding or a first preformed molding of gripper G1, whose external shape is shown as rectangular G2 part in contact with a molding material before molding or a first preformed molding of gripper G2, whose external shape is shown as rectangular G3 part in contact with a molding material before molding or a first preformed molding of gripper G3, whose external shape is shown as rectangular G4 part in contact with a molding material before molding or a first preformed molding of gripper G4, whose external shape is shown as rectangular G5 part in contact with a molding material before molding or a first preformed molding of gripper G5, whose external shape is shown as rectangular G6 part in contact with a molding material before molding or a first preformed molding of gripper G6, whose external shape is shown as rectangular G7 part in contact with a molding material before molding or a first preformed molding of gripper G7, whose external shape is shown as rectangular P1 part in contact with a molding material before molding or a first preformed molding of pusher P1, whose external shape is shown as elliptic P2 part in contact with a molding material before molding or a first preformed molding of pusher P2, whose external shape is shown as rectangular P3 part in contact with a molding material before molding or a first preformed molding of pusher P3, whose external shape is shown as rectangular 3 carrier: mechanism for moving in front-back direction and crosswise direction 4 carrier: mechanism for moving in vertical direction 5 gripping part, part supporting grippers 6 gripper 6a position of gripping part and gripper before holding a molding material (first position)

6b position of gripping part and gripper holding a molding material (second position)

7 preforming device 7a preforming device before forming a molding material (first position)

7b example of preforming device forming a molding material (second position)

8 pusher 9 carrier robot 10 arm 11 hand body 12 carrier, carrier, gripping part, gripper, preforming device and pusher (carriers having devices)

13 example of cutting positions of a wire material for obtaining circular arc needles from the circular wire material N1 to N4 first to fourth circular arc needles obtained by cutting the wire into four 14 example of concrete shape of circular arc needle 15 thickness direction of circular arc needle having a circular cross-section

The invention claimed is:

1. A method of manufacturing a press molding, comprising the following steps:

Step 11: step of heating a molding material comprising discontinuous carbon fibers having a weight average fiber length of not less than 2 mm and a thermoplastic resin at a temperature not lower than the softening temperature of the thermoplastic resin, Step 21: step of carrying the molding material heated at a temperature not lower than the softening temperature into an the upper mold and a the lower mold of a mold for compression molding by supporting the molding material with a carrier, wherein a plurality of grippers are located in the carrier, and wherein the grippers traverse the molding material (i) at a point or (ii) across a linear distance having a length which is not more than 10 times the thickness of the molding material, wherein each of the grippers has a circular arc needle with an approximate curvature radius which is not less than the thickness of the molding material +5 mm and not more than 40 times of the thickness of the molding material and the circular arc needle is stuck into the molding material to hold it, Step 22: step of pushing and bending the molding material partially with the grippers and pushers arranged between the grippers while the molding material is kept stuck with the circular arc needle to preform it at a preforming rate of 80 to 100%, Step 31: step of press molding the molding material by closing the upper mold and the lower mold and applying pressure to obtain the press molding and taking out the press molding from the mold by opening the mold for compression molding when the temperature of the press molding becomes lower than the softening temperature of the thermoplastic resin.

2. The method of manufacturing a press molding according to claim 1, wherein the carrier has a hand body with a plate or frame structure, the grippers and the pushers can move in a direction approaching or a direction departing from the hand body, and the grippers can move in a direction along with the hand body.

3. The method of manufacturing a press molding according to claim 2, wherein the pushers can move in a direction along with the hand body.

4. The method of manufacturing a press molding according to claim 2, wherein the hand body can be inclined at any angle.

5. The method of manufacturing a press molding according to claim 1, wherein, at the time of preforming in the step 22, preforming is carried out at a variation rate represented by the following expression of the shortest distance from the position of a circular arc needle which is one gripper or the contact position between the pusher and the molding material to the position of a circular arc needle which is another gripper or the contact position between the pusher and the molding material along the surface of the molding material of −10 to 10%, $$\text{Variation rate}=(C-D)/D\times 100(\%) \quad (1)$$

C: shortest distance from the position of one circular arc needle or the contact position between the pusher and the molding material to the position of another circular arc needle or the contact position between the pusher and the molding material along the surface of the molding material after preforming, D: shortest distance from the position of one circular arc needle or the contact position between the pusher and the molding material to the position of another circular arc needle or the contact position between the pusher and the molding material along the surface of the molding material before preforming.

6. The method of manufacturing a press molding according to claim 1, wherein the heat conductivity of the pushers is lower than the heat conductivity of the molding material, and the shape of the pushers is rod-like, pyramid-like, spherical or plate-like.

7. The method of manufacturing a press molding according to claim 1, wherein the weight average fiber length of the discontinuous carbon fibers is not less than 10 mm, and the thickness of the molding material is not less than ½ of the thickness of the circular arc needle.

8. The method of manufacturing a press molding according to claim 1, wherein at least part of the surface of the circular arc needle is coated with at least one fluorine-based resin.

9. The method of manufacturing a press molding according to claim 1, wherein water or a release agent is applied to the circular arc needle after the step 31, and the process returns to the step 11 to carry out the next press molding.

10. The method of manufacturing a press molding according to claim 1, wherein a press molding having elevation faces is produced by preforming the molding material after the step 21 and before the step 31, and parts of the molding material are overlapped with each other to preform the elevation faces, and the molding material is one molding material which has an area to be overlapped to form the elevation faces or a material obtained by dividing a molding material into a plurality of parts, and the overlapping rate of the molding material represented by the following numerical expression (2) is not less than 200%, Overlapping rate (%)=maximum length of overlapped part/thickness of molding material×100 (2).

11. The method of manufacturing a press molding according to claim 3, wherein the hand body can be inclined at any angle.

* * * * *